(12) United States Patent
Bestler et al.

(10) Patent No.: US 10,110,676 B2
(45) Date of Patent: Oct. 23, 2018

(54) PARALLEL TRANSPARENT RESTRUCTURING OF IMMUTABLE CONTENT IN A DISTRIBUTED OBJECT STORAGE SYSTEM

(71) Applicant: Nexenta Systems, Inc., Santa Clara, CA (US)

(72) Inventors: Caitlin Bestler, Sunnyvale, CA (US); Alexander Aizman, Santa Clara, CA (US); Robert E. Novak, Union City, CA (US)

(73) Assignee: NEXENTA SYSTEMS, INC., Santa Clara, CA (US)

( * ) Notice: Subject to any disclaimer, the term of this patent is extended or adjusted under 35 U.S.C. 154(b) by 385 days.

(21) Appl. No.: 14/998,320

(22) Filed: Dec. 24, 2015

(65) Prior Publication Data

US 2016/0205190 A1 Jul. 14, 2016

Related U.S. Application Data

(63) Continuation-in-part of application No. 14/832,075, filed on Aug. 21, 2015, now Pat. No. 9,923,970.
(Continued)

(51) Int. Cl.
*H04L 29/08* (2006.01)
*G06F 17/30* (2006.01)
(Continued)

(52) U.S. Cl.
CPC .... *H04L 67/1097* (2013.01); *G06F 17/30312* (2013.01); *H04L 12/1854* (2013.01);
(Continued)

(58) Field of Classification Search
CPC . H04L 67/1097; H04L 12/1877; H04L 47/15; H04L 12/1854; G06F 17/30312
See application file for complete search history.

(56) References Cited

U.S. PATENT DOCUMENTS

| 7,681,104 B1 | 3/2010 | Sim-Tang et al. |
| 7,681,105 B1 | 3/2010 | Sim-Tang et al. |

(Continued)

OTHER PUBLICATIONS

Lluis Pamies-Juarez, et al "Decentralized Erasure Coding for Efficient Data Archival in Distributed Storage Systems", Jan. 3-6, 2016, pp. 42-56, XP055233970 14th International Conference, Mumbai, India.
(Continued)

*Primary Examiner* — Arvin Eskandarnia
(74) *Attorney, Agent, or Firm* — Okamoto & Benedicto LLP

(57) ABSTRACT

The present disclosure provides an innovative technique for parallel transparent restructuring of immutable content in a distributed object storage system. The content restructuring technique disclosed herein may be implemented with parallel operations by multiple storage servers in a live system. The restructuring is transparent in that the original CHIT may still be used to retrieve and validate the original content, such that a client requesting the original content need not be aware that the original content has been restructured. Furthermore, the restructuring is performed while maintaining support for pre-existing immutable metadata. Other embodiments, aspects and features are also disclosed. The content remains immutable from the perspective of the end user, but still may be advantageously restructured to optimize storage efficiency.

10 Claims, 25 Drawing Sheets

Related U.S. Application Data

(60) Provisional application No. 62/098,727, filed on Dec. 31, 2014, provisional application No. 62/040,962, filed on Aug. 22, 2014.

(51) Int. Cl.
   *H04L 12/18* (2006.01)
   *H04L 12/801* (2013.01)
   *H04L 29/06* (2006.01)

(52) U.S. Cl.
   CPC .......... *H04L 12/1877* (2013.01); *H04L 47/15* (2013.01); *H04L 67/10* (2013.01); *H04L 67/1095* (2013.01); *H04L 67/28* (2013.01); *H04L 67/42* (2013.01); *H04L 69/04* (2013.01)

(56) References Cited

U.S. PATENT DOCUMENTS

| | | |
|---|---|---|
| 7,725,655 B2 | 5/2010 | Frolund et al. |
| 8,051,361 B2 | 11/2011 | Sim-Tang et al. |
| 8,051,362 B2 | 11/2011 | Li et al. |
| 8,086,937 B2 | 12/2011 | Sim-Tang et al. |
| 8,205,139 B1 | 6/2012 | Sim-Tang et al. |
| 8,473,778 B2 | 6/2013 | Simitci et al. |
| 8,533,231 B2 | 9/2013 | Aizman et al. |
| 8,677,219 B2 | 3/2014 | Lei et al. |
| 8,819,261 B2 * | 8/2014 | Zuckerman .......... H04L 67/1008 709/231 |
| 8,914,736 B2 * | 12/2014 | Cardasco ............ G06F 11/3006 715/234 |
| 9,122,627 B1 | 9/2015 | Sim-Tang et al. |
| 2014/0204940 A1 | 7/2014 | Bestler et al. |
| 2014/0204941 A1 | 7/2014 | Bestler et al. |
| 2014/0207849 A1 | 7/2014 | Bestler et al. |
| 2014/0207850 A1 | 7/2014 | Bestler et al. |
| 2014/0304357 A1 | 10/2014 | Bestler et al. |

OTHER PUBLICATIONS

Bin Fan, et al "DiskReduce: RAID for Data-Intensive Scalable Computing", Nov. 20, 2009, pp. 6-10, XP055233575, Proceedings of the 4th Annual Workshop on Petascale Data Storage, New York, USA.

Cheng Huang, et al "Erasure Coding in Windows Azure Storage", Apr. 11, 2013, pp. 1-12, XP061013941, Microsoft Corporation.

Anwitaman Datta, et al "Storage Codes: Managing Big Data with Small Overheads", Jun. 7, 2013, pp. 1-6, XP032446615, IEEE International Symposium.

Lluis Pamies-Juarez, et al "RapidRAID: Pipelined Erasure Codes for Fast Data Archival in Distributed Storage Systems", Apr. 14, 2013, pp. 1294-1302, XP032440881, INFOCOM IEEE Proceedings.

* cited by examiner

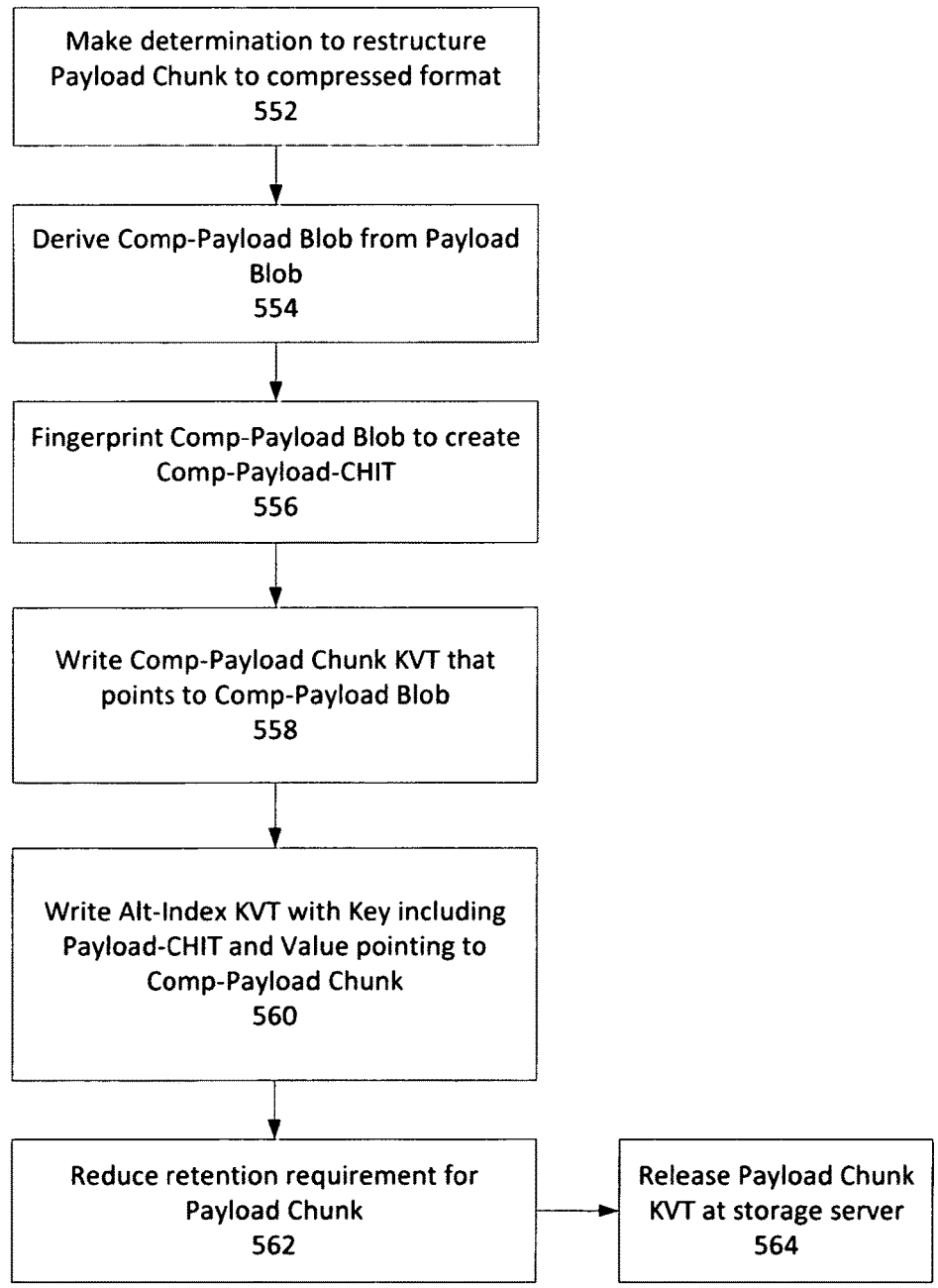
FIG. 5C     550

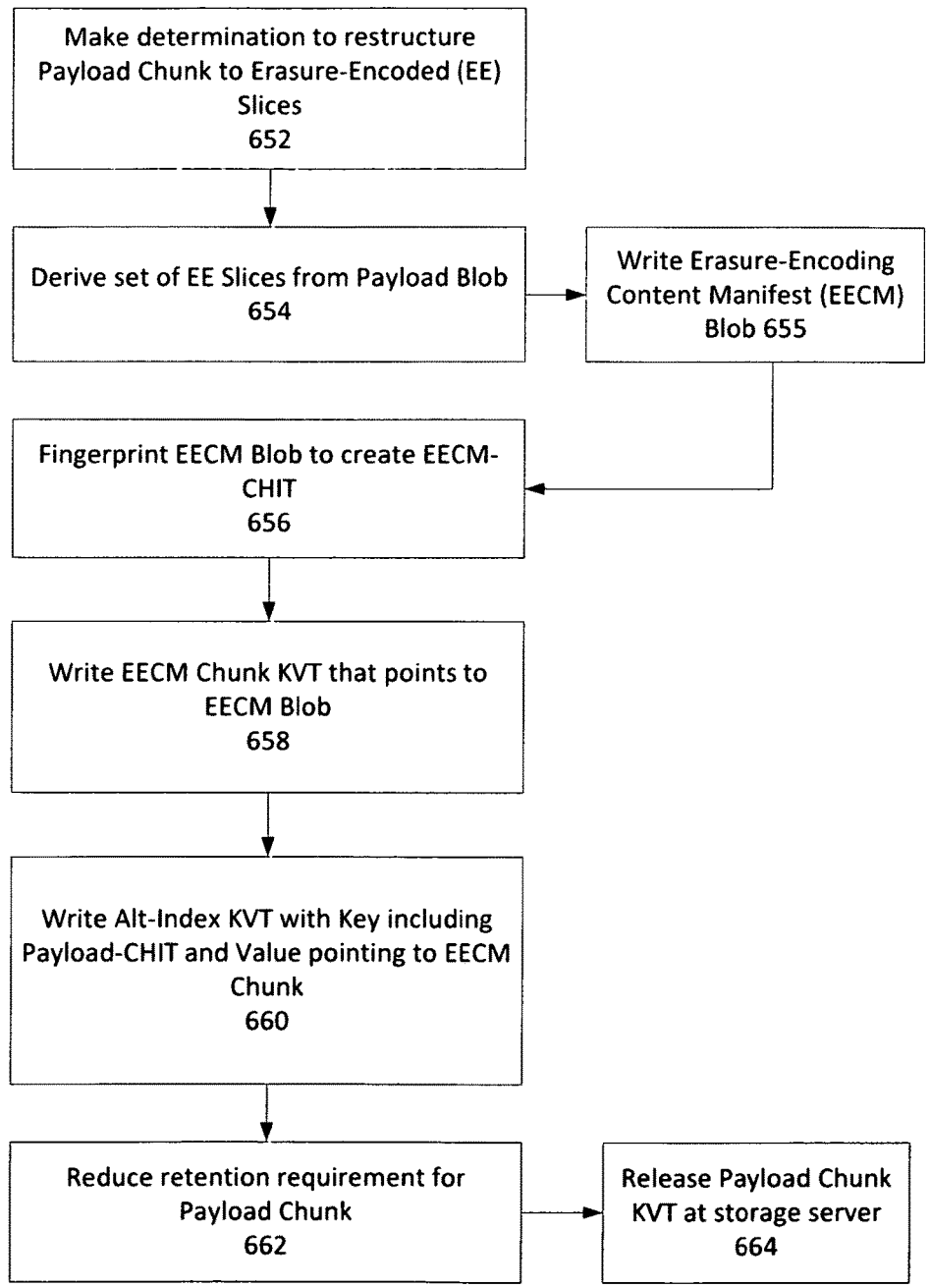
FIG. 6C        650

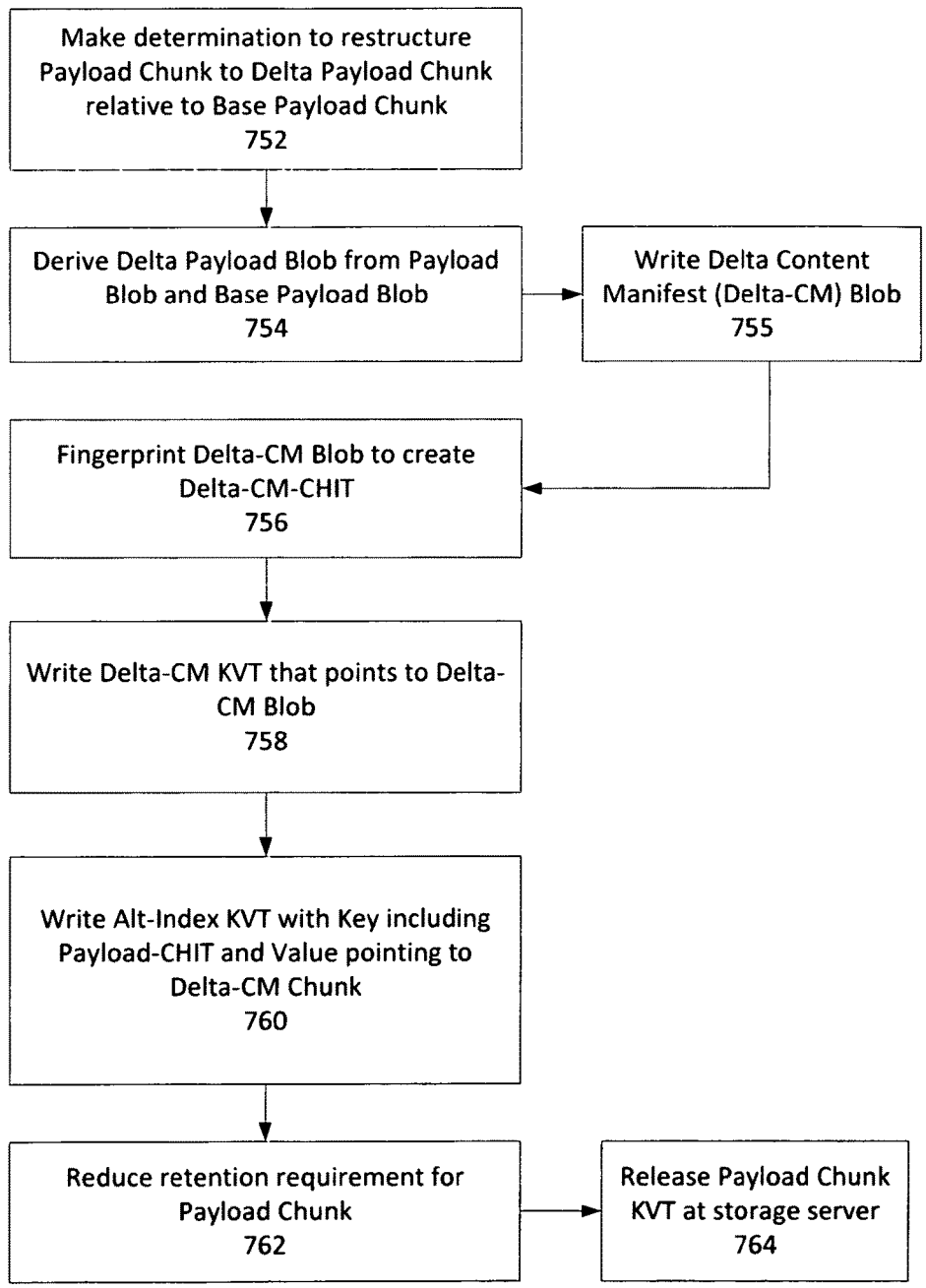
FIG. 7C       750

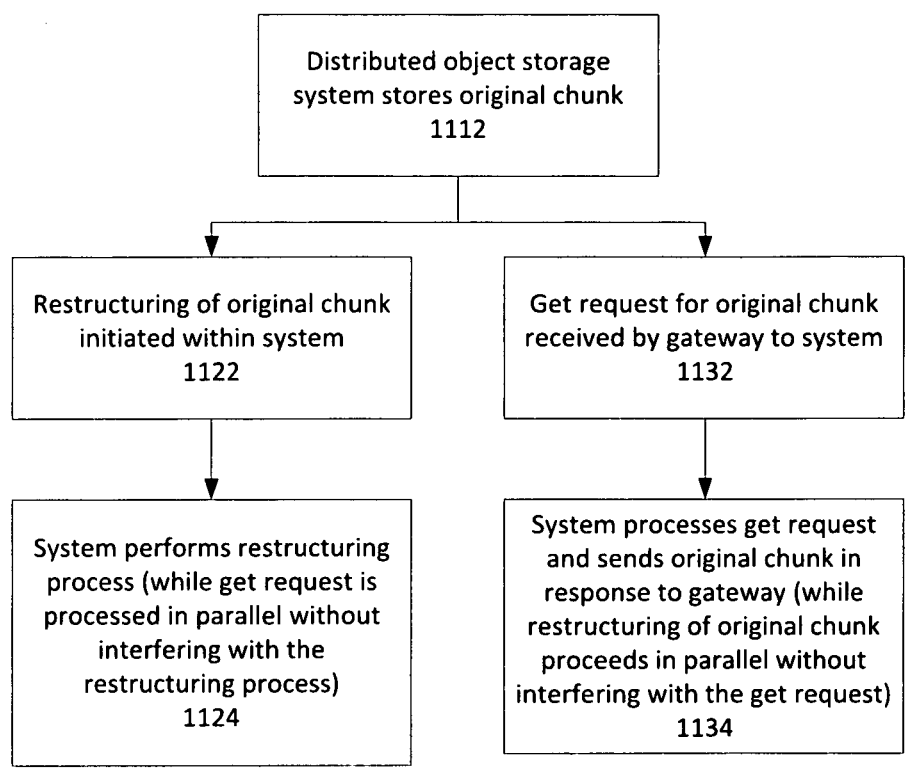
FIG. 11    1100

PARALLEL TRANSPARENT RESTRUCTURING OF IMMUTABLE CONTENT IN A DISTRIBUTED OBJECT STORAGE SYSTEM

CROSS-REFERENCE TO RELATED APPLICATION(S)

The present application claims the benefit of U.S. Provisional Patent Application No. 62/098,727, filed Dec. 31, 2014. The present application is a continuation-in-part of U.S. patent application Ser. No. 14/832,075, filed Aug. 21, 2015. U.S. patent application Ser. No. 14/832,075 claims the benefit of U.S. Provisional Patent Application Nos. 62/098,727, filed Dec. 31, 2014, and 62/040,962, filed Aug. 22, 2014. The disclosures of the aforementioned patent applications and provisional patent applications are each hereby incorporated by reference in its entirety.

BACKGROUND

Technical Field

The present disclosure relates generally to data storage systems and data communication systems.

Description of the Background Art

With the increasing amount of data being created, there is increasing demand for data storage solutions. Storing data using a cloud storage service is a solution that is growing in popularity. A cloud storage service may be publicly-available or private to a particular enterprise or organization. Popular public cloud storage services include Amazon S3™, the Google File System, and the OpenStack Object Storage (Swift) System™.

Cloud storage systems may provide "get" and "put" access to objects, where an object includes a payload of data being stored. The payload of an object may be stored in parts referred to as "chunks". Using chunks enables the parallel transfer of the payload and allows the payload of a single large object to be spread over multiple storage servers.

SUMMARY

The present disclosure provides an innovative technique for parallel transparent restructuring of immutable content in a distributed object storage system. The content restructuring technique disclosed herein may be implemented with parallel operations by multiple storage servers in the system. The restructuring is transparent in that the original reference, referred to as a CHIT, may still be used to retrieve and validate the original content, such that a client requesting the original content need not be aware that the original content has been restructured. Furthermore, the restructuring is performed while maintaining support for pre-existing immutable metadata. The content remains immutable from the perspective of the end user, but still may be advantageously restructured to optimize storage efficiency.

Other embodiments, aspects, and features are also disclosed.

BRIEF DESCRIPTION OF THE DRAWINGS

FIG. 5C is a flow chart of a method of restructuring an original-format payload chunk to a compressed payload chunk in accordance with an embodiment of the invention.

FIG. 6C is a flow chart of a method of restructuring an original-format payload chunk to a set of erasure-encoded slices in accordance with an embodiment of the invention.

FIG. 7C is a flow chart of a method of restructuring an original-format payload chunk to a delta payload relative to a base payload in accordance with an embodiment of the invention.

FIG. 11 is a flow chart showing that the restructuring of a chunk using the presently-disclosed technique may be performed by a live system because the restructuring does not interfere with normal operations of the system relating to the chunk.

DETAILED DESCRIPTION

Trade-Offs with Different Structures

Figure 1:
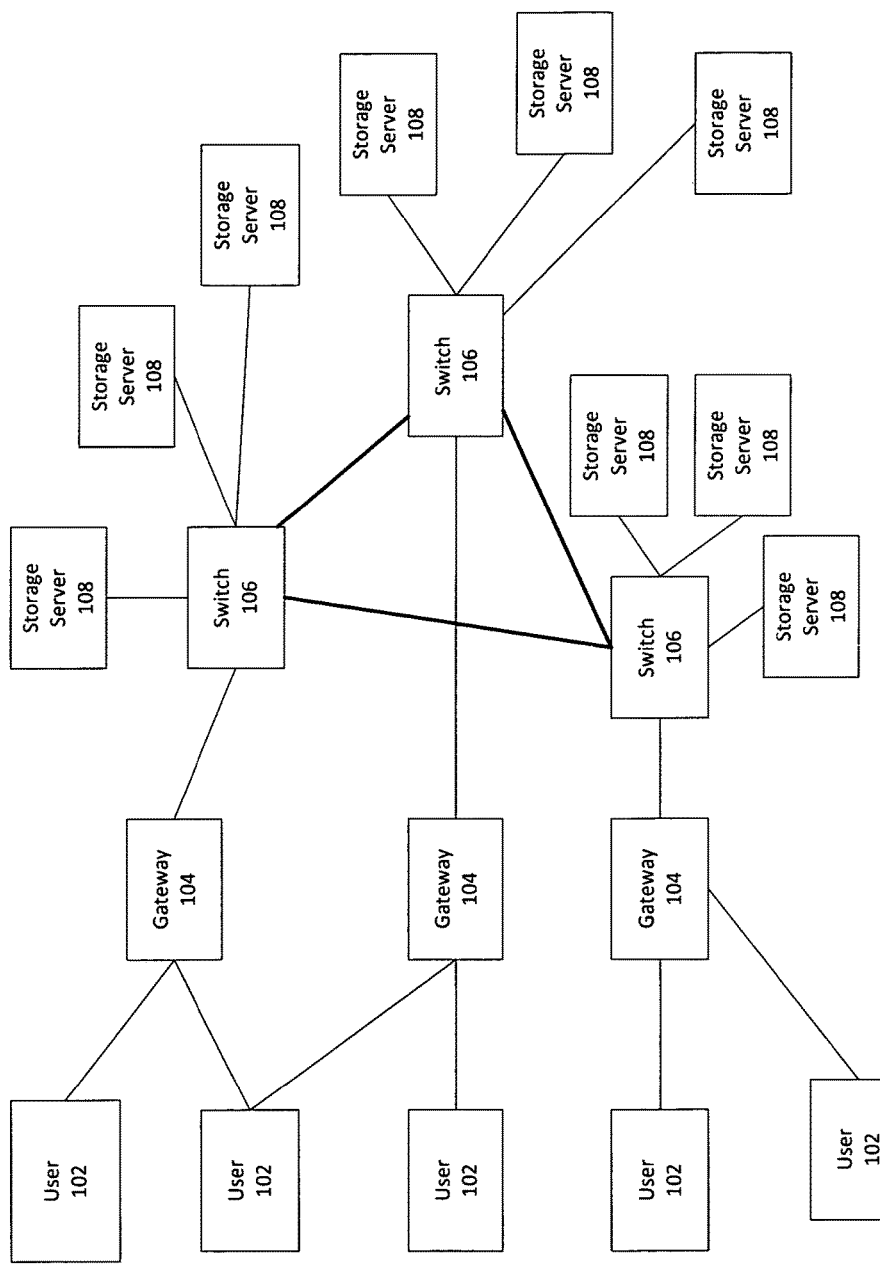
FIG. 1 depicts a distributed object storage system in accordance with an embodiment of the invention.

When storing a vast number of objects, it may be advantageous for a storage cluster to restructure stored data with a different encoding structure to be optimal for current retrieval needs. This is because the optimal format for storing the same information can change over time for an object.

For example, at a first time, it may be more advantageous to store the data as whole replicas, in the same form for the data as when it is delivered to the application layer. Retrieving whole replicas may have the lowest latency, depending on the relative speed on the network versus decompression. On the other hand, at a second time, it may be more advantageous to store the data using erasure encoded slices. Using erasure encoding or other similar encoding options can reduce the amount of raw storage capacity required to reliably hold an object. However, these encoding options typically increase the latency for retrieving data so encoded.

Such trade-offs, such as between conserving storage space and retrieving data with low latency, are likely to vary as networking, storage and processing costs change over the lifespan of what is supposed to be a single object. Hence, it is desirable for the storage cluster to restructure stored data so that it can minimize the overall cost of being able to faithfully and reliably deliver that data on demand.

Restructuring of Immutable Content

In order to restructure stored data, an object storage cluster needs the capability to create derivatives of existing data in new formats at various times. This capability to create derivatives of stored data may appear to be potentially at conflict with the "immutable" (unchangeable) nature of chunks created by certain object storage clusters, such as, for example, the object storage cluster described in U.S. Pat. No. 8,533,231 ("Cloud Storage System with Distributed Metadata," inventors Alexander Aizman and Caitlin Bester), and the object storage cluster using multicast transport described in U.S. Patent Application Publication No. 2014/0204941 ("Scalable Transport System for Multicast Replication"). In these previous object storage clusters, when a chunk is put to the storage cluster, an immutable chunk reference (chunk identifier) is returned. The chunk identifier is globally unique and never re-used to identify a different chunk payload. Such a chunk identifier advantageously prevents accidental or deliberate alteration of chunk payload. This is true even when the physical storage of the chunk is not under control of the storage cluster. The capability to attest to data being intact from accidental corruption or even deliberate alteration is vital to providing document archiving.

Fortunately, using the techniques disclosed herein, an object storage cluster may restructure the encoding of already stored data with such pre-existing references that are immutable. The techniques disclosed herein enable the restructuring to be performed while advantageously still supporting the pre-existing references to this content. In accordance with an embodiment of the invention, the techniques disclosed herein provide the capability to use the original reference to drive the validation of the restructured content. This enables content that is considered to be "immutable" by the storage cluster user to be restructured in a transparent manner in numerous advantageous ways.

Transparent Restructuring

In a previous object storage cluster, while the application layer may be aware that a given chunk of data is a derivation from another chunk, the storage layer itself is generally unaware of the derivation relationship between the two chunks. In other words, unless the derivation generates a simple copy of the chunk, the previous storage layer is not aware of the fact that one chunk is derived from another chunk.

In contrast, the presently-disclosed storage cluster utilizes a storage layer that has information on derivation relationships between data chunks (including both payload data chunks and cluster metadata chunks). The derivation relationship information enables the presently-disclosed storage cluster to restructure data transparently. The transparent restructuring enables a storage cluster to re-encode chunks or whole objects in alternate formats while still supporting both the original references to the content and allowing the original references to drive validation of the restructured content.

The presently-disclosed techniques for transparent restructuring are compatible with a distributed object cluster that uses cluster metadata that specifies payload as uniquely identified chunks, without recording the specific locations of any replica. These techniques are further compatible with totally decentralized processing, as featured by certain distributed object clusters.

Parallel Restructuring

Conventional storage clusters that lack location and format independence in their metadata can only restructure storage through a process which restructures the payload and replaces the existing metadata. This requires a single process for any given object that is being restructured. Any requirement for a single process limits the scalability of the network.

The presently-disclosed restructuring technique avoids these restrictions. Each storage server is free to choose which tuples it stores for a given chunk. Hence, the restructuring may proceed in parallel with independent processes running on multiple storage servers at the same time.

Parallel Transparent Restructuring of Immutable Content

The present disclosure describes systems and methods for parallel transparent restructuring of immutable content (PTRIC). The PTRIC technology taught in this section may be applied within a distributed object storage cluster, especially for object storage systems that allow payload references to be cached extensively. For such systems, being able to honor existing chunk references, even after the underlying content has been restructured, is of considerable value.

Further, the PTRIC technology disclosed herein is fully compatible with a fully-distributed object storage cluster. That is, the restructuring may be implemented without requiring any central point of processing. Advantageously, the presently-disclosed PTRIC technology allows storage servers (also referred to herein as storage nodes) to encode facets of the information about a chunk to enable optimized handling of derivate data and re-encoding of payload to alternate formats (such as erasure encoding) without requiring any modifications to the cluster metadata referencing the chunk.

FIG. 1 is a high-level system diagram showing various components of a distributed object storage system 100 in accordance with an embodiment of the invention. As shown, users 102 may access the storage servers (storage nodes) 108 of the distributed object storage system 100 via gateway servers 104 and a network of switches 106. The users 102 may be clients or proxies operating on behalf of clients.

A gateway server 104 may be defined as a server in the set of servers responsible for making special replications of chunks that do not get added to the Chunk's replication count. A gateway server may be used as the front-end or gateway to either archival storage or as gateways to a remote cluster that shares knowledge of assets.

In an exemplary implementation, the switches 106 may be a non-blocking switch. A switch can be considered to be non-blocking if it is capable of running every one of its links at full capacity without dropping frames, as long as the traffic was distributed such that it did not exceed the capacity on any one of its links. For example, each of the eight ports of a non-blocking 8-port switch is capable of sending 1/7th of the wire speed to each of the other ports. A non-blocking switch has sufficient internal buffering so it can queue the output frames to any one of its ports. The other ports can "share" this output without having to synchronize their transmissions. If they each have a sustained rate of 1/7th of the wire capacity then the output queue for the target port may grow temporarily, but it will not grow indefinitely.

The storage servers 108 may act as chunk servers that store and provide access to chunks of objects. The storage servers 108 may also act as manifest servers that store and provide access to Version Manifests and Content Manifests.

Note that each component of the storage system need not be on a separate computer system. For example, a gateway server 104 may be implemented on a same computer system as storage server 108.

Figure 2:
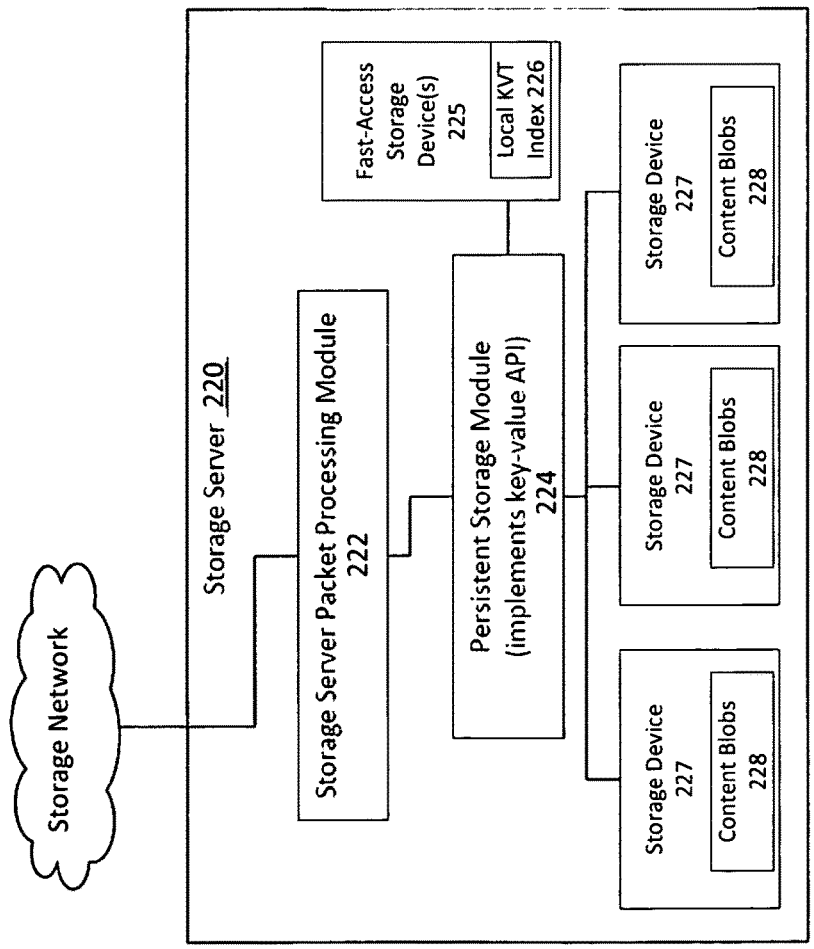
FIG. 2 illustrates an exemplary architecture for a storage server that implements persistent storage of key-value tuples in accordance with an embodiment of the invention.

FIG. 2 illustrates an exemplary architecture for a storage server 220 that implements persistent storage of key-value tuples in accordance with an embodiment of the invention. As illustrated, the storage server 220 may include a Storage Server Packet Processing Module 222; a Persistent Storage Module 224; Fast-Access Storage Devices 225 and Storage Devices 227.

The Storage Server Packet Processing Module 222 is the primary module that process and transmits packets to the other members of the distributed object storage system.

The Persistent Storage Module 224 is a module that implements a key-value application programming interface (key-value API). The key-value API provides access to the local KVT index 226. The local KVT index 226 may be stored on a fast-access storage device or devices 225. The Fast-Access Storage Devices 225 may be random access memories (RAMs) or solid-state drives (SSDs), for example.

Content blobs 228 may be stored locally on the Storage Devices 227 that are accessible by the Persistent Storage Module 224. The Storage Devices 227 may be hard drives, for example.

The local KVT index 226 stores KVTs, each KVT consisting of a Key and an associated Value. The KVTs include Chunk KVTs and Index KVTs.

A Chunk KVT has a Key having a Content Hash Identifying Tokens (CHIT) that identifies a Content Blob, and a Value that points to the storage location of the Content Blob (binary large object). Together, a Chunk KVT and its associated Content Blob may be referred to as a Chunk. The Content Blob may store payload or a type of metadata. The metadata may be, for example, a Version Manifest, a Content Manifest, a set of Back-References, or other metadata.

An Index KVT may be associated with a Chunk KVT and provides further information associated with the Content Blob. The further information may be, for example, an Object Name associated with a Version Manifest, or a Chunk associated with a set of Back-References.

Figure 3:
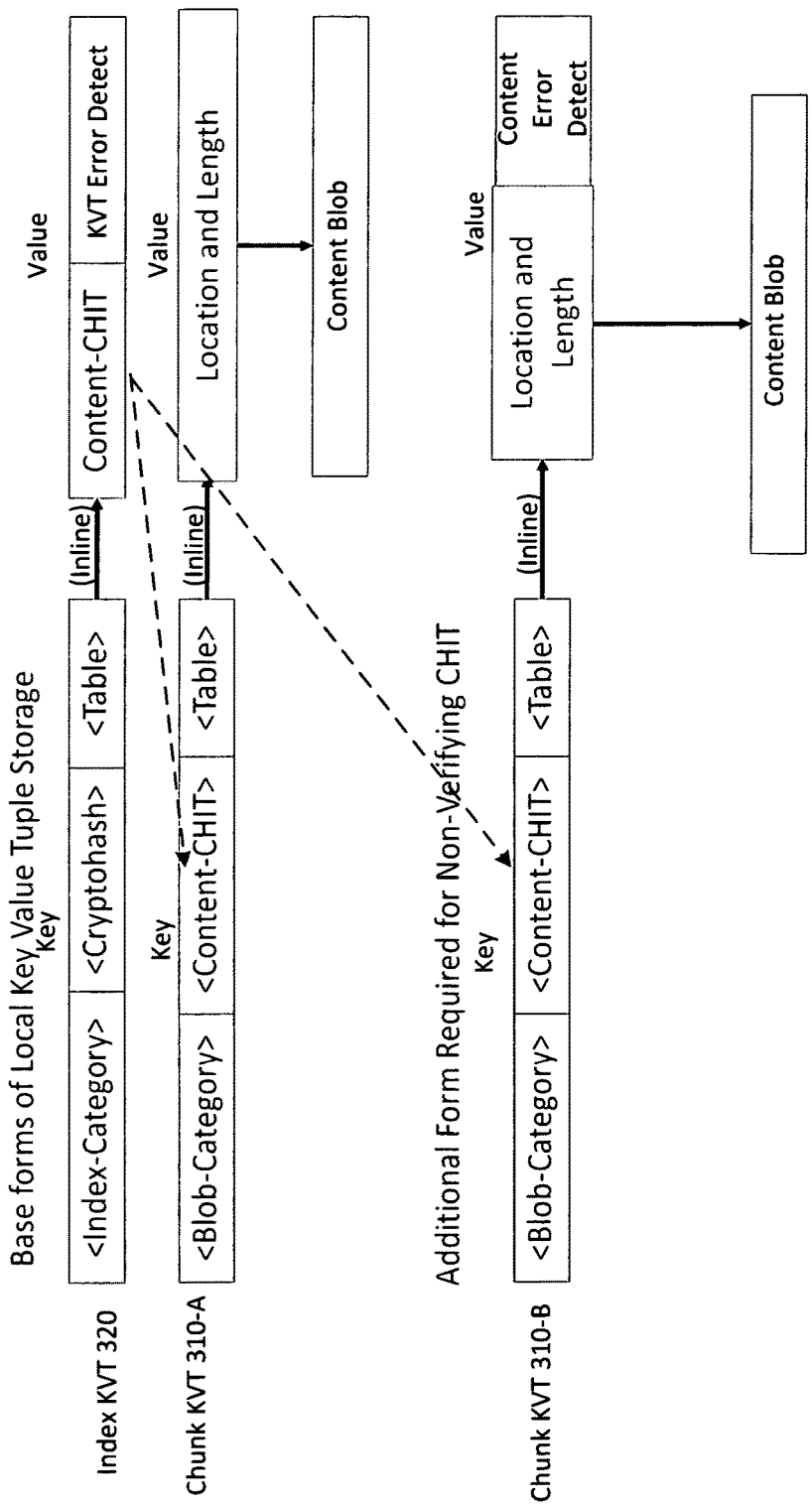
FIG. 3 depicts three forms of KVT entries in accordance with an embodiment of the invention.

FIG. 3 depicts three forms of KVT entries in accordance with an embodiment of the invention. The three forms include two Chunk KVT forms (310-A and 310-B) and an Index KVT form (320). Each form includes a Key that is associated with a Value so as to constitute a Key-Value-Tuple (KVT). This association may be implemented by an inline arrangement of the Key and Value.

Chunk KVT 310-A is a KVT structure that provides access to a Content Blob (binary large object) via a self-verifying content hash identifying token (Content-CHIT). A self-verifying CHIT may be defined to be an identifying token for a chunk formed by applying a cryptographic hash on the Content Blob. The full CHIT includes preferably both the cryptographic hash value and an enumerator identifying the cryptographic hash algorithm used. Together, the Chunk KVT 310-A and the referenced Content Blob may be referred to as simply a Chunk.

The Key of Chunk KVT 310-A includes a <Blob-Category>, a <Content-CHIT> and a <Table>. The <Blob-Category> field of the Key indicates the Category of the Content Blob and may be the most significant portion of the bits of the Key. For example, the Blob-Category may indicate that the Content Blob contains payload or that the Content Blob contains a type of metadata, such as, for example, a Version Manifest or a Content Manifest. The <Content-CHIT> field of the Key provides the CHIT of the Content Blob and may be a next most significant portion of the bits of the Key, where the CHIT serves as a fingerprint that is used to verify the Content Blob. The <Table> field of the Key may provide additional information regarding the Content, such as type-related information and may be a least significant portion of the bits of the Key.

The Value of Chunk KVT 310-A provides the location and length of the Content Blob. The Content Blob may contain payload or metadata.

Chunk KVT 310-B is an alternative KVT structure that provides access to a Content Blob (binary large object) via a non-verifying CHIT (Content-CHIT). The CHIT is non-verifying in that the CHIT itself is not useable to verify the Content. Chunk KVT 310-B is similar to Chunk 310-A. However, since Chunk KVT 310-B has a non-verifying CHIT, Content Error Detection data is included in the Value of Chunk KVT 310-B. The Content Error Detection data may be, for example, a cyclic redundancy check (CRC) code, a cryptographic hash, or other error detection code generated from the Content Blob. While the present disclosure primarily describes implementations that use the Chunk KVT 310-A form (with verifying CHIT), alternative implementations may use the Chunk KVT 310-B form (with non-verifying CHIT).

The usage of Error Detection data is optional for KVTs when the ultimately referenced payload provides its own error detection. For example, the payload of a Version Manifest contains a metadata field specifying the fully-qualified object name. If this name does not match the Name Hash that started the search, then this can be treated the same as an inconsistent Error Detection field, that is the entry is invalid and should be expunged.

An Index KVT 320 may be used to provide supplementary information related to a Chunk KVT (of either form 310-A or 310-B). For example, a Name-Index KVT provides an Object Name related to a Version-Manifest Chunk KVT. Other uses of an Index KVT 320 are disclosed herein. Of particular interest, the present disclosure describes innovative uses of an Index KVT to provide parallel transparent restructuring of immutable content.

The Key of Index KVT 320 contains an <Index-Category> field, a <Cryptohash> field, and a <Table> field. In an exemplary arrangement, the <Index-Category> is provided in a most-significant portion of the bits of the Key, the <Cryptohash> is provided in a next-most significant portion of the bits of the Key, and the <Table> is provided in a least-most significant portion of the bits of the Key. Other arrangements may be utilized instead.

The <Index-Category> indicates a high-level Category (Major Type data) of the supplementary information. For example, the Category may indicate that the supplementary information relates to an Object Name, in which case the Index KVT may be referred to as a Name-Index KVT. The <Cryptohash> may be used for various purposes, depending on the Category of Index KVT. For example, the Cryptohash for a Name-Index KVT provides a Name Hash Identifying Token (NHIT). The <Table> field of the Key may provide further information, such as finer category information that may be referred to as a minor key.

The Value of the Index KVT entry comprises the Content-CHIT and may include error detection data. The Content-CHIT provides an index to the Key of the Chunk KVT entry (i.e. points to the Chunk KVT entry) with which this Index KVT entry is associated. In other words, the Content-CHIT provides a pointer from the Index KVT entry to the associated Chunk KVT entry. The error detection data is useable to validate the Index KVT entry. The error detection data may be, for example, a cyclic redundancy check (CRC) code, a cryptographic hash, or other error detection code. In some cases, the error detection data may not be needed in the Index KVT entry, such as, for example, a Name-Index KVT entry does not need error detection data when the Object Name and Name Hash Identifying Token (NHIT) are included in the Version Manifest Blob.

Figure 4A:
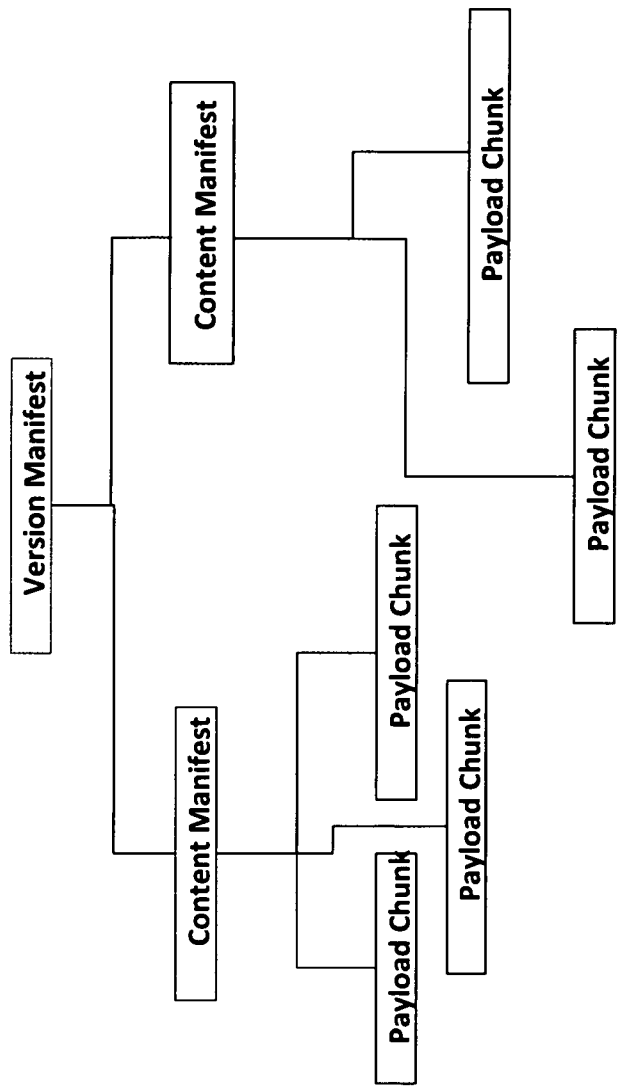
FIG. 4A depicts a hierarchical structure for the storage of an object into chunks in accordance with embodiment of the invention.

FIG. 4A depicts a hierarchical structure for the storage of an object into chunks in accordance with embodiment of the invention. The top of the structure is a Version Manifest that may be associated with a current version of an Object. The Version Manifest holds the root of metadata for an object and has a Name Hash Identifying Token (NHIT). As shown, the Version Manifest may reference Content Manifests, and each Content Manifest may reference Payload Chunks. Note that a Version Manifest may also directly reference Payload Chunks and that a Content Manifest may also reference further Content Manifests.

In an exemplary implementation, a Version Manifest contains a list of tokens (CHITs) that identify Payload Chunks and/or Content Manifests and information indicating the order in which they are combined to reconstitute the Object Payload. The ordering information may be inherent in the order of the tokens or may be otherwise provided. Each Content Manifest Chunk contains a list of tokens (CHITs) that identify Payload Chunks and/or further Content Manifest Chunks (and ordering information) to reconstitute a portion of the Object Payload.

Figure 4B:
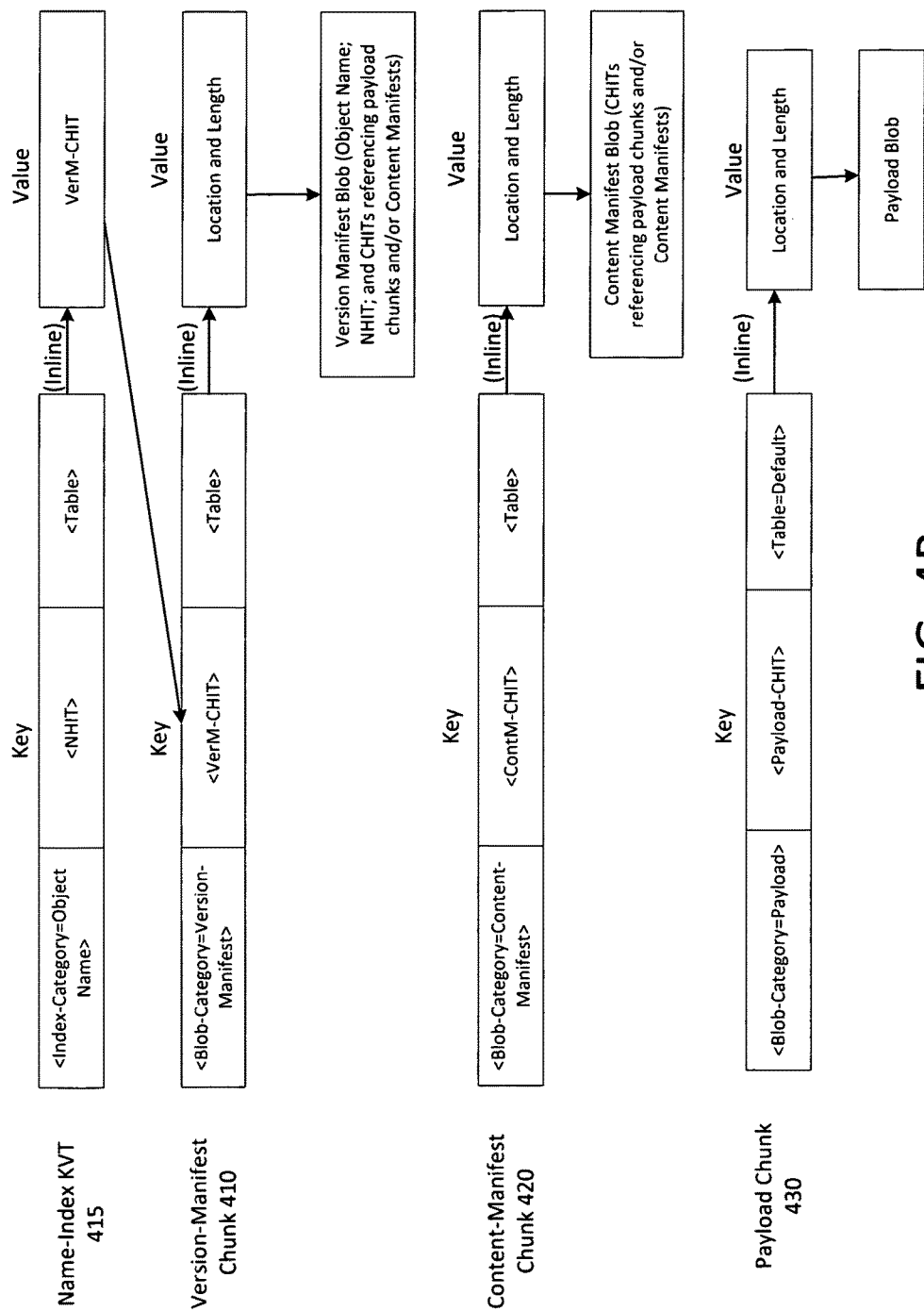
FIG. 4B depicts KVT entries that are used to implement the hierarchical structure of FIG. 4A in accordance with an embodiment of the invention.

FIG. 4B depicts KVTs that are used to implement the hierarchical structure of FIG. 4A in accordance with an embodiment of the invention. Depicted in FIG. 4B are a Version-Manifest Chunk 410, a Content-Manifest Chunk 420, and a Payload Chunk 430. Also depicted is a Name-Index KVT 415 that relates an NHIT to a Version Manifest 415.

The Version-Manifest Chunk 410 includes a Version-Manifest Chunk KVT and a referenced Version Manifest Blob. The Key of the Version-Manifest Chunk KVT has a <Blob-Category=Version-Manifest> that indicates that the Content of this Chunk is a Version Manifest. The Key also has a <VerM-CHIT> that is a CHIT of the Version Manifest Blob. The Value of the Version-Manifest Chunk KVT points to the Version Manifest Blob. The Version Manifest Blob contains CHITs that reference Payload Chunks and/or Content Manifest Chunks, along with ordering information to reconstitute the Object Payload. The Version Manifest Blob may also include the Object Name and the NHIT.

The Content-Manifest Chunk 420 includes a Content-Manifest Chunk KVT and a referenced Manifest Contents Blob. The Key of the Content-Manifest Chunk KVT has a <Blob-Category=Content-Manifest> that indicates that the Content of this Chunk is a Content Manifest. The Key also has a <ContM-CHIT> that is a CHIT of the Content Manifest Blob. The Value of the Content-Manifest Chunk KVT points to the Content Manifest Blob. The Content Manifest Blob contains CHITs that reference Payload Chunks and/or further Content Manifest Chunks, along with ordering information to reconstitute a portion of the Object Payload.

The Payload Chunk 430 includes the Payload Chunk KVT and a referenced Payload Blob. The Key of the Payload Chunk KVT has a <Blob-Category=Payload> that indicates that the Content of this Chunk is a Payload Blob. The Key also has a <Payload-CHIT> that is a CHIT of the Payload Blob. The Value of the Payload Chunk KVT points to the Payload Blob.

Finally, a Name-Index KVT 415 is also shown. The Key of the Name-Index KVT has an <Index-Category=Object Name> that indicates that this index KVT provides Name information for an Object. The Key also has a <NHIT> that is a Name Hash Identifying Token. The NHIT is an identifying token of an Object formed by calculating a cryptographic hash of the fully-qualified object name. The NHIT includes an enumerator specifying which cryptographic hash algorithm was used as well as the cryptographic hash result itself.

Figure 4C:
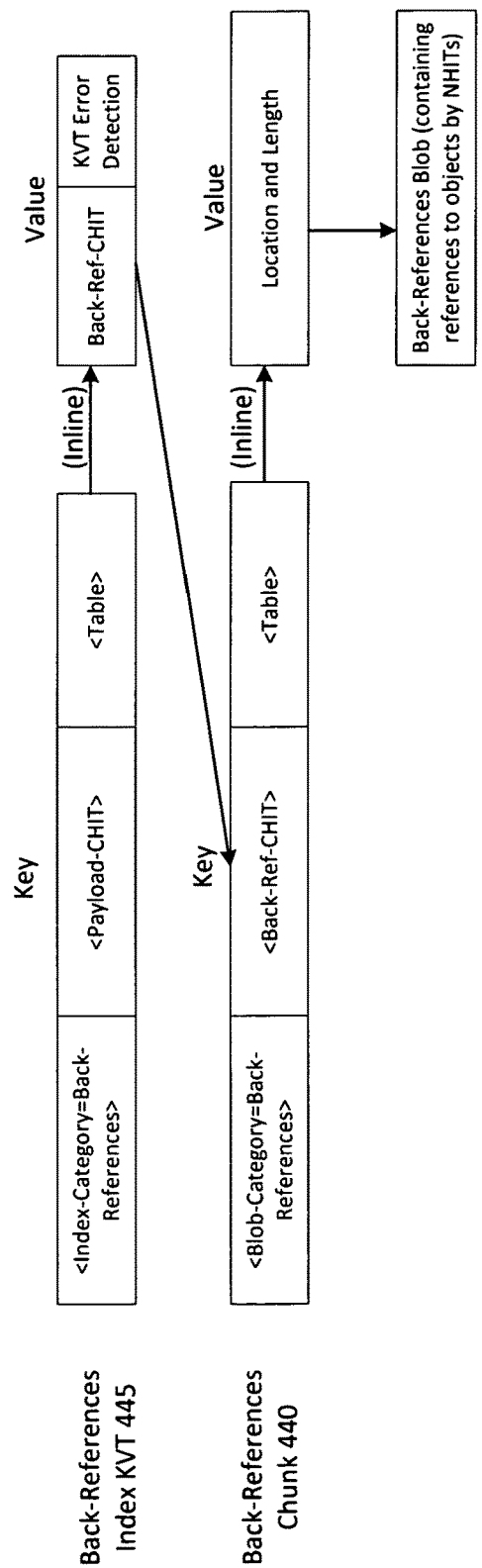
FIG. 4C depicts KVT entries for tracking back-references from a chunk to objects in accordance with an embodiment of the invention.

While FIG. 4B depicts the KVT entries that allow for the retrieval of all the payload chunks needed to reconstruct an object payload, FIG. 4C depicts KVT entries that allow tracking of all the objects to which a payload chunk belongs. The tracking is accomplished using back-references from a payload chunk back to objects to which the payload chunk belongs.

A Back-Reference Chunk 440 is shown that includes a Back-References Chunk KVT and a Back-References Blob. The Key of the Back-Reference Chunk KVT has a <Blob-Category=Back-References> that indicates that this Chunk contains Back-References. The Key also has a <Back-Ref-CHIT> that is a CHIT of the Back-References Blob. The Value of the Back-Reference Chunk KVT points to the Back-References Blob. The Back-References Blob contains NHITs that reference the Name-Index KVTs of the referenced Objects.

A Back-References Index KVT 445 is also shown. The Key has a <Payload-CHIT> that is a CHIT of the Payload to which the Back-References belong. The Value includes a Back-Ref CHIT which points to the Back-Reference Chunk KVT.

Restructuring to Compressed Payload

Figure 5A:
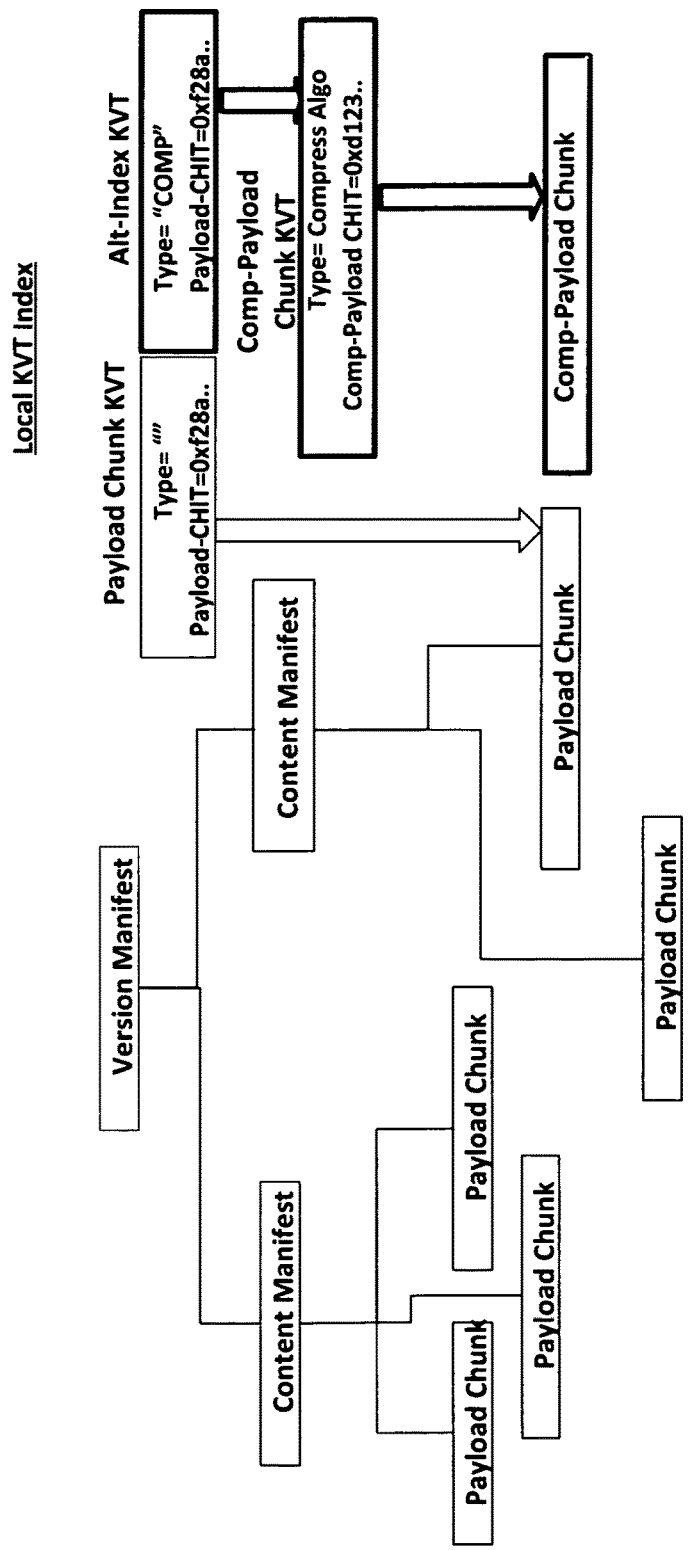
FIG. 5A depicts a payload chunk that has been restructured transparently into a compressed payload chunk in accordance with an embodiment of the invention.

FIG. 5A depicts the hierarchical structure for the storage of an object into chunks after a Payload Chunk has been restructured by applying data compression in accordance with an embodiment of the invention. The restructured Payload Chunk is referred to as the Comp-Payload Chunk.

Figure 5B:
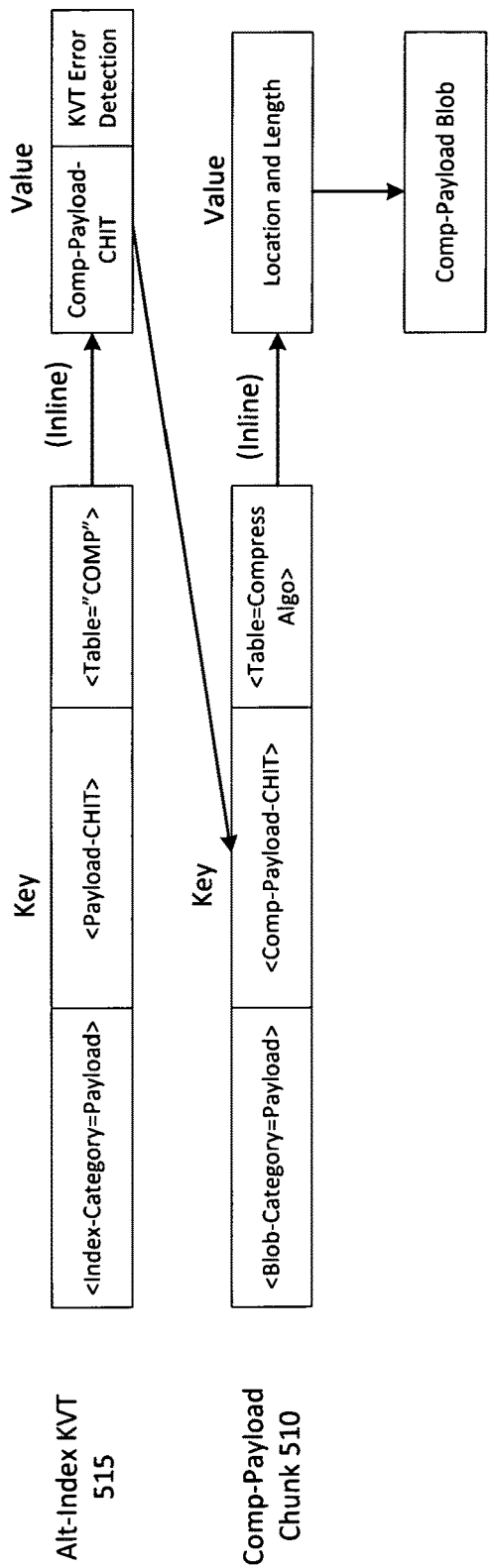
FIG. 5B depicts an Alt-Index KVT entry and an Alternate-Payload Chunk KVT entry which are used to implement the restructuring shown in FIG. 5A in accordance with an embodiment of the invention.

A Local KVT Index is stored at, and accessed by, the Storage Server that stores the Payload Chunk. Depicted in FIG. 5A are two KVT entries that are used to implement the restructuring of the Payload Chunk: an Alt-Index KVT and a Comp-Payload Chunk KVT. The Alt-Index KVT 515 and Comp-Payload Chunk 510 are depicted in detail in FIG. 5B.

The (Original) Payload Chunk that is restructured includes a Payload-Chunk KVT (depicted separately in FIG. 5A, though it is part of the Payload Chunk) and a Payload Blob. The Key of the Payload Chunk KVT has a Payload-CHIT (=0xf28a . . . , for example) that identifies the (Original) Payload Blob. In addition, the Key of the Payload Chunk KVT may have a " " (i.e. blank) in the type field (i.e. in the Table portion of the Key) to designate that the Payload Blob is in its original format.

The Comp-Payload Chunk 510 (which is the Payload Chunk after compression) includes a Comp-Payload Chunk KVT and a Comp-Payload Blob. The Key of the Comp-Payload Chunk KVT has a Comp-Payload-CHIT (=0xd123 . . . , for example) that identifies the Comp-Payload Blob. In addition, the Key of the Comp-Payload Chunk KVT may have a type field (i.e. in the Table portion of the Key) that indicates the compression algorithm (Compress Algo) used in generating the Comp-Payload Blob. The Value of the Comp-Payload Chunk KVT points to the Comp-Payload Blob.

The present disclosure provides an Alt-Index KVT 515 that effectively links the Comp-Payload Chunk to the (Original) Payload Chunk in an advantageous way. The Key of the Alt-Index KVT has an Index-Category of Payload and includes the Payload-CHIT that identifies the (Original) Payload Blob. In other words, the CHIT of the Alt-Index KVT is the same as the CHIT of the (Original) Payload Chunk KVT. The Value of the Alt-Index KVT points to the Comp-Payload Blob. Together, these features advantageously enable the retrieval of the Comp-Payload Chunk when the (Original) Payload Chunk is requested. In addition, the Key of the Alt-Index KVT may have a "COMP" in the type field (i.e. in the Table portion of the Key) to indicate that the alternate (i.e. restructured) format is a compressed format.

FIG. 5C is a flow chart of a method 550 of restructuring the (original) Payload Chunk to a Compressed Payload Chunk in accordance with an embodiment of the invention. The method 550 may include the following steps.

Per step 552, a determination may be made that the (original) Payload Chunk is to be compressed. For example, the Back-References from the Payload Chunk may only be to Objects that are rarely accessed. As such, it may be determined that saving space by compression outweighs the performance penalty that would occur due to the need to perform decompression when retrieving the Payload Chunk.

Per step 554, a Compressed Payload (Comp-Payload) Blob may be derived from the Payload Blob. This step may be performed using any of various conventional compression procedures.

Per step 556, the Comp-Payload Blob may be fingerprinted to create a verifying Comp-Payload CHIT. This step may be performed using a cryptographic hash procedure, for example. (Alternatively, a non-verifying Comp-Payload CHIT may be created, and the fingerprint may be used for error detection data to verify the Comp-Payload Blob.)

Per step 558, the Comp-Payload Chunk KVT may be created with a Key that includes the Comp-Payload CHIT and a Value that points to the Comp-Payload Blob. (If the Comp-Payload CHIT is non-verifying, then the Value may include the fingerprint as error detection data.) Together, the Comp-Payload Chunk KVT and Comp-Payload Blob form the Comp-Payload Chunk.

Per step 560, the Alt-Index KVT may be created. The Alt-Index KVT has a Key including the (Original) Payload CHIT, and a Value with the Comp-Payload CHIT so as to point to the Comp-Payload Chunk. As described in detail in the present disclosure, the Alt-Index KVT enables a search for the (Original) Payload Chunk to return the Comp-Payload Chunk.

Per step 562, the need for this storage server to retain the (Original) Payload Chunk is eliminated after the Comp-Payload KVT is created. Hence, the Payload Chunk KVT entry at the storage server may be marked as removable.

Per step 564, the Payload Chunk KVT entry at the storage server may be removed. The removal may occur at a future time, such as, for example, after the storage server receives confirmation of the successful creation of the Comp-Payload Chunk.

Restructuring to Erasure-Encoded Slices

Figure 6A:
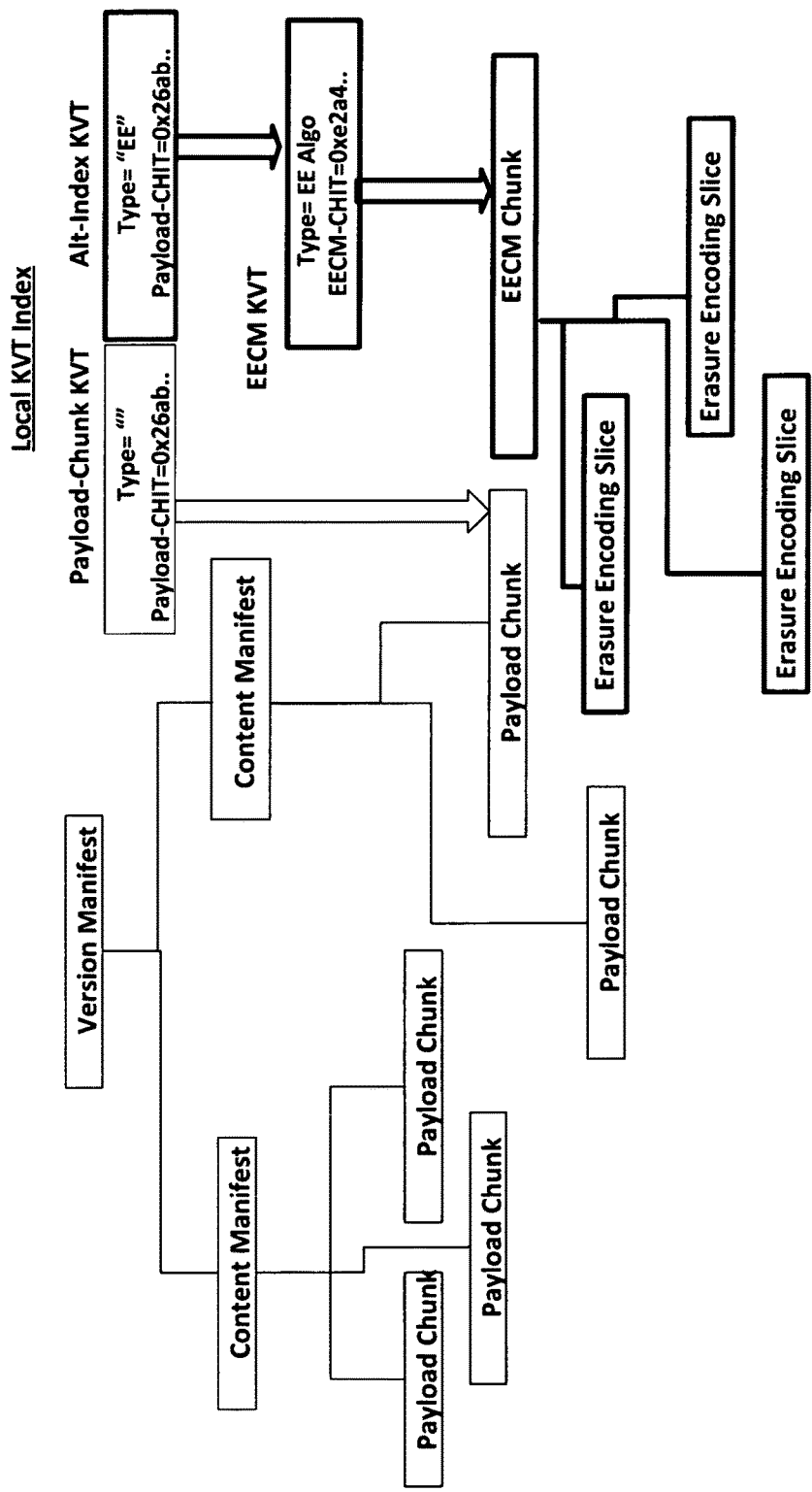
FIG. 6A depicts a payload chunk that has been restructured transparently into erasure-encoded slices in accordance with an embodiment of the invention.
Figure 6B:
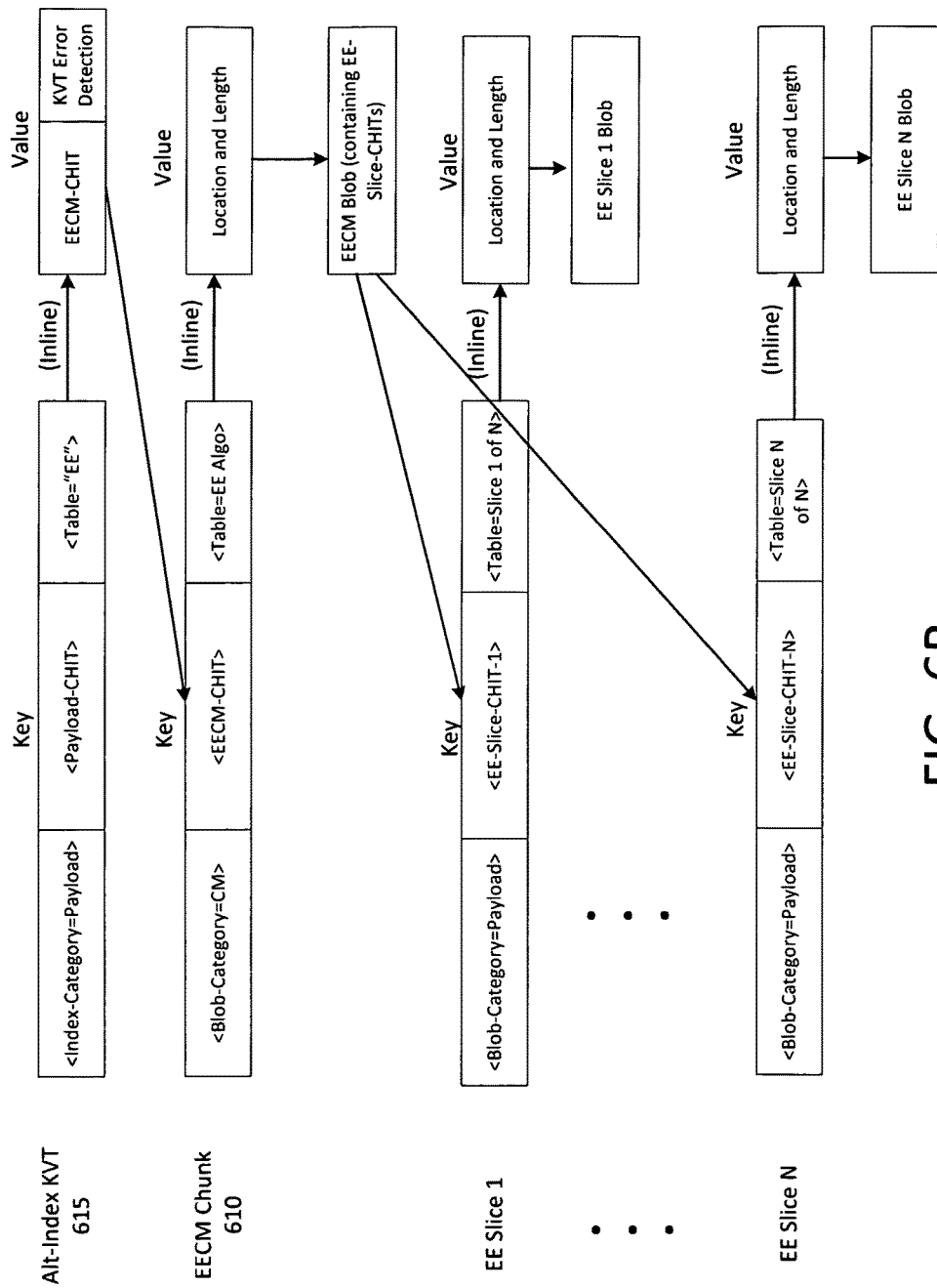
FIG. 6B depicts an Alt-Index KVT entry, an Erasure-Encoded Content-Manifest (EECM) Chunk KVT entry and multiple Erasure-Encoded (EE) Slice KVTs which are used to implement the restructuring shown in FIG. 6A in accordance with an embodiment of the invention.

FIG. 6A depicts the hierarchical structure for the storage of an object into chunks after a Payload Chunk has been restructured to Erasure-Encoded Slices in accordance with an embodiment of the invention. Erasure Encoding is an encoding scheme where the data is spread across N slices, where at most M of them are needed to reconstruct the lost slices. In the context of the present disclosure, erasure encoding is one of the alternate formats supported by the Parallel Transparent Restructuring of Immutable Content. FIG. 6B depicts an Alt-Index KVT 615, an Erasure-Encoded Content-Manifest (EECM) Chunk 610 and multiple Erasure-Encoded (EE) Slices which are used to implement the restructuring shown in FIG. 6A in accordance with an embodiment of the invention.

The (Original) Payload Chunk that is restructured includes a Payload-Chunk KVT (depicted separately in FIG. 6A, though it is part of the Payload Chunk) and a Payload Blob. The Key of the Payload Chunk KVT has a Payload-CHIT (=0x26ab . . . , for example) that identifies the (Original) Payload Blob. In addition, the Key of the Payload Chunk KVT may have a " " (i.e. blank) in the type field (i.e. in the Table portion of the Key) to designate that the Payload Blob is in its original format.

The EECM Chunk 610 includes an EECM Chunk KVT (depicted separately in FIG. 6A, though it is part of the EECM Chunk) and an EECM Blob. The Key of the EECM Chunk KVT has a EECM-CHIT (=0xe2a4 . . . , for example) that identifies and validates the EECM Blob. In addition, the Key of the EECM Chunk KVT may have a type field (i.e. in the Table portion of the Key) that indicates the erasure-encoding algorithm (EE Algo) used in generating the Erasure-Encoded Slices. The Value of the EECM Chunk KVT points to the EECM Blob.

The present disclosure provides an Alt-Index KVT 615 that effectively links the EECM Chunk to the (Original) Payload Chunk in an advantageous way. The Key of the Alt-Index KVT has an Index-Category of Payload and includes the Payload-CHIT that identifies the (Original) Payload Blob. In other words, the CHIT of the Alt-Index KVT is the same as the CHIT of the (Original) Payload Chunk KVT. The Value of the Alt-Index KVT points to the EECM Chunk. Together these features advantageously enable the retrieval of the EECM-Payload Chunk when the (Original) Payload Chunk is requested. In addition, the Key of the Alt-Index KVT may have an "EE" in the type field (i.e. in the Table portion of the Key) to indicate that the alternate (i.e. restructured) format is an erasure-encoded format.

The EECM Blob contains EE-Slice-CHITs (1 to N). EE-Slice-CHIT-1 points to EE Slice 1, EE-Slice-CHIT-2 points to EE Slice 2, . . . , EE-Slice-CHIT-N points to EE Slice N. The <Table> in the Key of each EE Slice n may indicate that the slice is n of N total slices. Note that, while the Alt-Index KVT 615 and the EECM Chunk 610 are preferably stored locally at the Storage Server, the EE Slices (1 to N) are preferably stored at different Storage Servers for robustness of the data storage.

FIG. 6C is a flow chart of a method 650 of restructuring the (original) Payload Chunk to a set of Erasure-Encoded Slices in accordance with an embodiment of the invention. The method 650 may be performed by a background process so as to minimize impact on "live" performance of the distributed object storage system. The method 650 may include the following steps.

Per step 652, a determination may be made that the (original) Payload Chunk is to be erasure encoded. This determination may be made, for example, by a background process so as to minimize impact on live performance of the system.

Per step 654, the set of Erasure-Encoded (EE) Slices may be derived from the Payload Blob. The EE Slices in the set may be generated at (and/or transferred to) different storage servers so as to protect the data from failure of a single storage server. The set may include a total of N EE Slices.

Per step 655, the Erasure-Encoding Content Manifest (EECM) Blob may be written. As discussed above, the EECM Blob contains EE-Slice-CHITs (1 to N). EE-Slice-CHIT-1 points to EE Slice 1, EE-Slice-CHIT-2 points to EE Slice 2, . . . , EE-Slice-CHIT-N points to EE Slice N. The <Table> in the Key of each EE Slice n may indicate that the slice is n of N total slices.

Per step 656, the EECM Blob may be fingerprinted to create a verifying EECM CHIT. This step may be performed using a cryptographic hash procedure, for example. (Alternatively, a non-verifying EECM CHIT may be created, and the fingerprint may be used for error detection data to verify the EECM Blob.)

Per step 658, the EECM Chunk KVT may be created with a Key that includes the EECM CHIT and a Value that points to the EECM Blob. (If the EECM CHIT is non-verifying, then the Value may include the fingerprint as error detection data for verifying the EECM Blob.) Together, the EECM Chunk KVT and EECM Blob form the EECM Chunk.

Per step 660, the Alt-Index KVT may be created. The Alt-Index KVT has a Key including the (Original) Payload CHIT, and a Value with the EECM CHIT so as to point to the EECM Chunk. As described in detail in the present disclosure, the Alt-Index KVT enables a search for the (Original) Payload Chunk to return the EECM Chunk, along with the EE Slices.

Per step 662, the retention requirement for the (Original) Payload Chunk may be reduced. This may be implemented, for example, by marking the Payload Chunk KVT entry at the storage server as releasable.

Per step 664, the Payload Chunk KVT entry at the storage server may be released. This release may occur at a future time, such as, for example, after the storage server receives confirmation of the successful creation of the complete set of EE Slices.

Note that the present disclosure contemplates two methods of encoding erasure-encoded slices of chunks. The first method, described above in relation to FIGS. 6A-6C, uses an erasure-encoded content manifest which enumerates the erasure encoding slices made from the original chunk, as well as the algorithm used (for example, Reed-Solomon) and the specific cardinality of the encoding (i.e. M of N).

In the second (alternative) method, the alternate content comprises an erasure-encoded slice, and an erasure-encoded slice KVT encodes a type that specifies a cardinality for the erasure encoding and a specific slice that is encoded. For example, a value X can specify that this is slice 2 of a Reed-Solomon 7 of 9 encoding. In this format, whichever server is gathering a roll call inventory responses is expected to understand the total size of the encoding (from the cardinality data) and check for an adequate set is present in the responses. In contrast, with the first method that uses an EECM, the set to be collected is explicitly stated in the EECM.

Erasure encoding advantageously encodes storage assets in slices across N devices or servers, where the original content can be restored from a lesser number M (M<N) of the data slices. For example, if M=8 and N=10 ("8 of 10" encoding), then each of N=10 slices contains a different 1/M=1/8 of the contents of the chunk. The N=10 slices in total store content the size of N/M=10/8 times the chunk size. This example of 8 of 10 encoding protects against the loss of two slices.

Erasure encoding reduces both network traffic and raw storage capacity required to store an asset at the cost of greater computational work being required on both put and get. Without erasure encoding, a conventional object cluster can only protect against the loss of two servers by creating three replicas. This requires that the content be transmitted over the network three times. With erasure encoding, a minimum of M slices, each holding at least 1/Nth of the total content, must be transmitted, resulting in M/Nths of the payload size. This represents a considerable savings in network bandwidth.

Restructuring to Base and Delta Payload

Figure 7A:
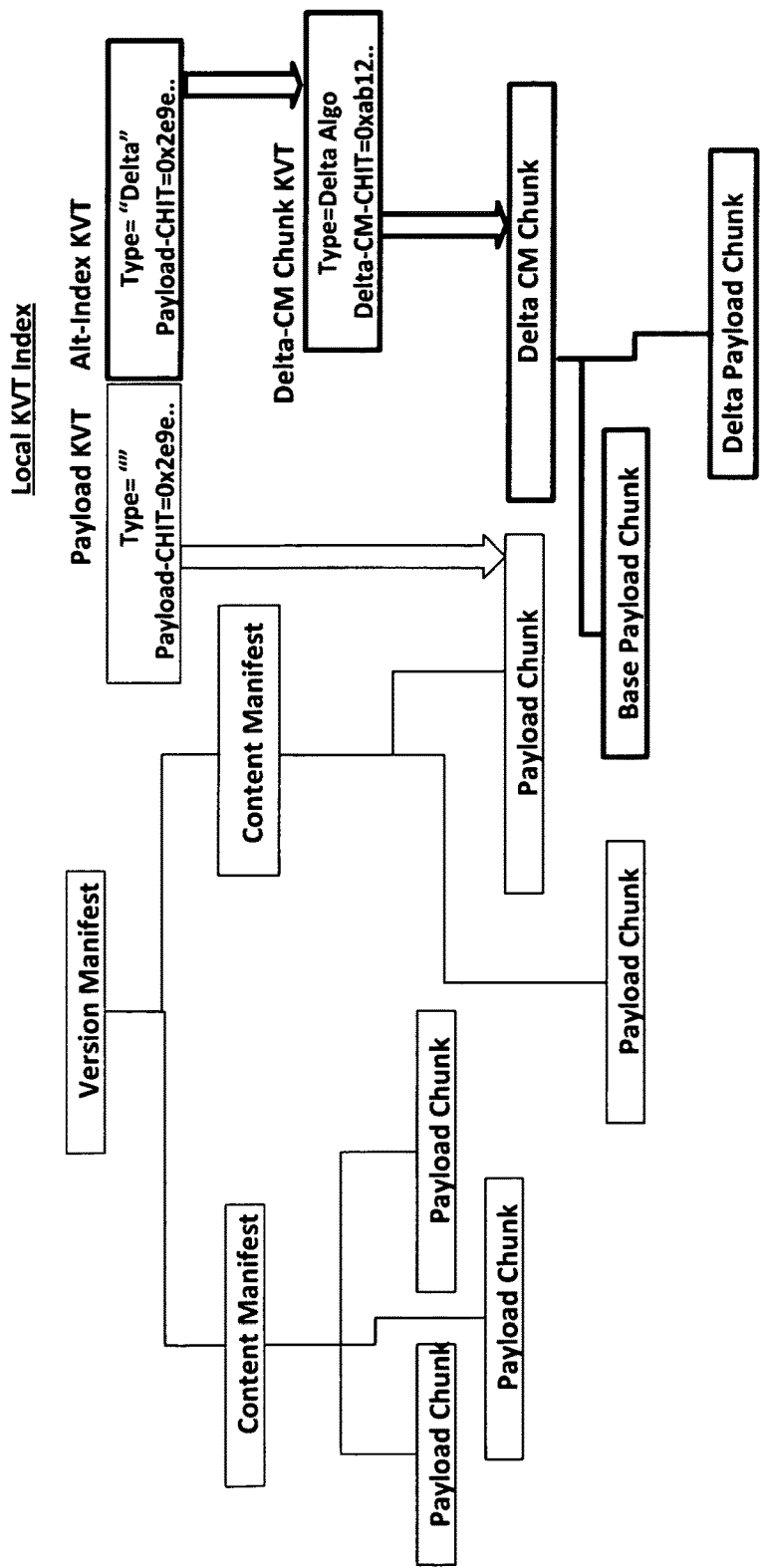
FIG. 7A depicts a payload chunk that has been restructured transparently into a base payload chunk and a delta payload chunk in accordance with an embodiment of the invention.
Figure 7B:
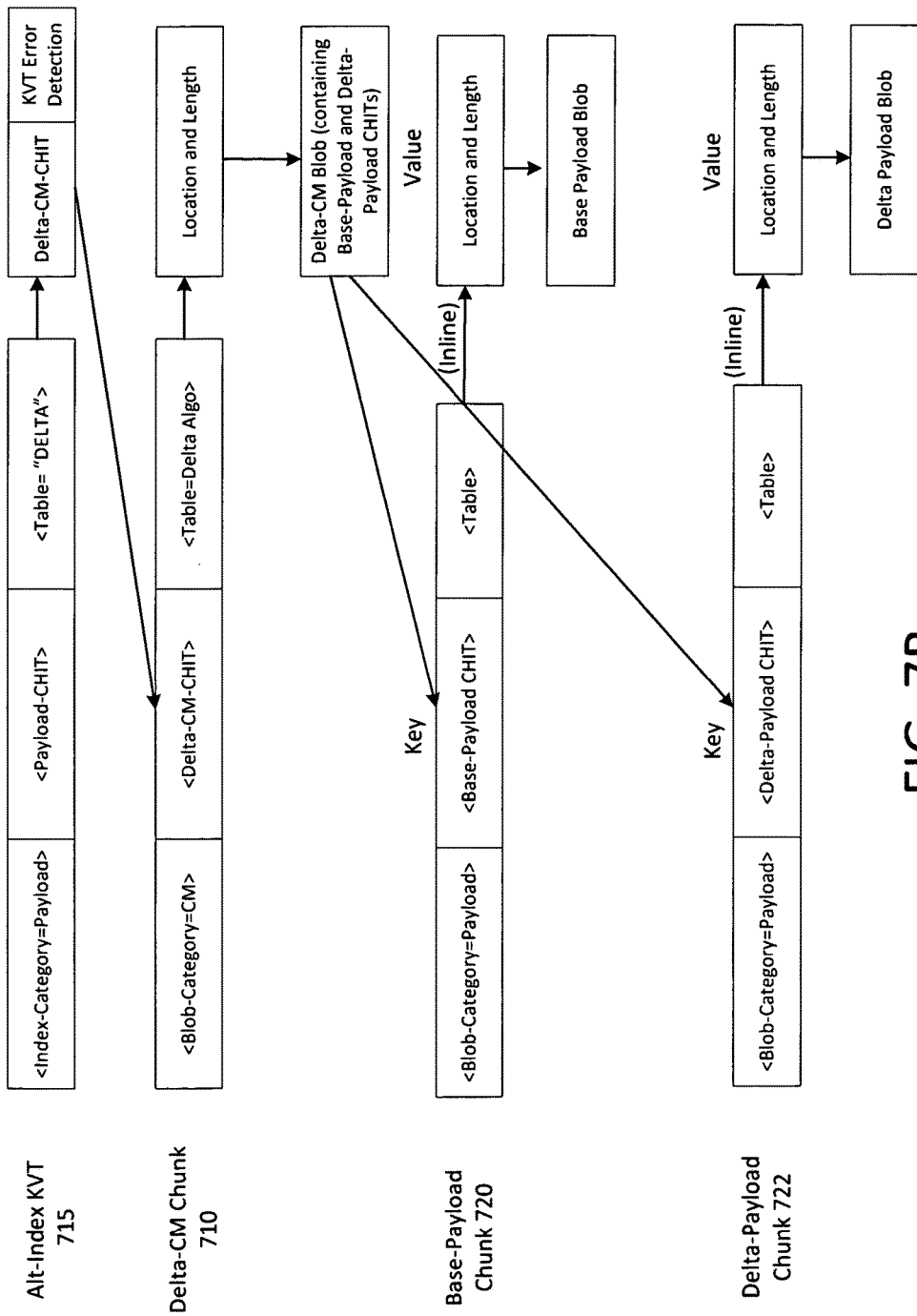
FIG. 7B depicts an Alt-Index KVT entry, an Delta-CM Chunk KVT entry and a Base-Payload KVT entry and a Delta-Payload KVT entry which are used to implement the restructuring shown in FIG. 7A in accordance with an embodiment of the invention.

FIG. 7A depicts the hierarchical structure for the storage of an object into chunks after a Payload Chunk has been restructured to a Base (Reference) Payload Chunk and a Delta Payload Chunk in accordance with an embodiment of the invention. The Delta Payload is the difference between the (Original) Payload before restructuring and the Base Payload. In other words, the (Original) Payload before restructuring may be regenerated by adding the Delta Payload to the Base Payload. FIG. 7B depicts an Alt-Index KV 715, a Delta Content Manifest (Delta-CM) Chunk 710, a Base-Payload Chunk 720 and a Delta-Payload Chunk 722 which are used to implement the restructuring shown in FIG. 7A in accordance with an embodiment of the invention.

The (Original) Payload Chunk that is restructured includes a Payload-Chunk KVT (depicted separately in FIG. 7A, though it is part of the Payload Chunk) and a Payload Blob. The Key of the Payload Chunk KVT has a Payload-CHIT (=0x2e9e . . . , for example) that identifies the (Original) Payload Blob. In addition, the Key of the Payload Chunk KVT may have a " " (i.e. blank) in the type field (i.e. in the Table portion of the Key) to designate that the Payload Blob is in its original format.

The Delta-CM Chunk 710 includes a Delta-CM Chunk KVT (depicted separately in FIG. 7A, though it is part of the Delta-CM Chunk) and a Delta-CM Blob. The Key of the Delta-CM Chunk KVT has a Delta-CM-CHIT (=0xab12 . . . , for example) that identifies and validates the Delta-CM Blob. In addition, the Key of the Delta-CM Chunk KVT may have a type field (i.e. in the Table portion of the Key) that may indicate a delta (difference) algorithm (Delta Algo) used in generating the Delta Payload. The Value of the Delta-CM Chunk KVT points to the Delta-CM Blob.

The present disclosure provides an Alt-Index KVT 715 that effectively links the Delta-CM Chunk to the (Original) Payload Chunk in an advantageous way. The Key of the Alt-Index KVT has an Index-Category of Payload and includes the Payload-CHIT that identifies the (Original) Payload Blob. In other words, the CHIT of the Alt-Index KVT is the same as the CHIT of the (Original) Payload Chunk KVT. In addition, the Value of the Alt-Index KVT points to the Delta-CM Chunk. The combination of these features advantageously enables the retrieval of the Delta-CM Chunk (along with the Delta and Base Payload Chunks) when the (Original) Payload Chunk is requested. In addition, the Key of the Alt-Index KVT may have a "DELTA" in the type field (i.e. in the Table portion of the Key) to indicate that the alternate (i.e. restructured) format is a delta format.

The Delta-CM Blob contains a Base-Payload CHIT and a Delta-Payload CHIT. The Base-Payload CHIT points to the Base-Payload Chunk 720, and the Delta-Payload-CHIT points to the Delta-Payload Chunk 722.

FIG. 7C is a flow chart of a method of restructuring an original-format payload chunk to a delta payload relative to a base payload in accordance with an embodiment of the invention. The method 750 may include the following steps.

Per step 752, a determination may be made that the (original) Payload Chunk is to be encoded into a Delta Payload Chunk relative to a Base Payload Chunk. The Base Payload Chunk may be, for example, a "previous version" of the Payload Chunk such that the difference between them is small.

Per step 754, the Delta Payload Blob may be derived from the Payload Blob and the Base Payload Blob. This step may be performed using a conventional difference algorithm.

Per step 755, the Delta Content Manifest (Delta-CM) Blob may be written. As discussed above, the Delta-CM Blob contains the Delta-Payload-CHIT and the Base-Payload-CHIT.

Per step 756, the Delta-CM Blob may be fingerprinted to create a verifying Delta-CM-CHIT. This step may be performed using a cryptographic hash procedure, for example. (Alternatively, a non-verifying Delta-CM-CHIT may be created, and the fingerprint may be used for error detection data to verify the Delta-CM Blob.)

Per step 758, the Delta-CM Chunk KVT may be created with a Key that includes the Delta-CM-CHIT and a Value that points to the Delta-CM Blob. (If the Delta-CM-CHIT is non-verifying, then the Value may include the fingerprint as error detection data for verifying the Delta-CM Blob.) Together, the Delta-CM Chunk KVT and Delta-CM Blob form the Delta-CM Chunk.

Per step 760, the Alt-Index KVT may be created. The Alt-Index KVT has a Key including the (Original) Payload CHIT, and a Value with the Delta-CM-CHIT so as to point to the Delta-CM Chunk. As described in detail in the present disclosure, the Alt-Index KVT enables a search for the (Original) Payload Chunk to return the Delta-CM Chunk, along with the Base and Delta Payload Chunks.

Per step 762, the retention requirement for the (Original) Payload Chunk may be reduced. This may be implemented, for example, by marking the Payload Chunk KVT entry at the storage server as releasable.

Per step 764, the Payload Chunk KVT entry at the storage server may be released. This release may occur at a future time, such as, for example, after the storage server receives confirmation of the successful creation of the Delta-format version of the Payload Chunk.

Restructuring Manifests

The restructuring techniques disclosed herein may be applied to a Chunk storing a Manifest, such as a Version Manifest, as well as to a Chunk storing a Payload. In general, the mechanisms described above for restructuring Payload Chunks are applicable for restructuring Manifest Chunks. Note that the content ultimately reached through an alternate (i.e. restructured) manifest is the same as the content ultimately reached from the original manifest.

By using the above-described technique to create an alternate encoding of a Version Manifest, the original encoding of the Version Manifest remains valid. This advantageously prevents expungement of the original encoding of the Version Manifest, although at a cost of storage space used.

Figure 8A:
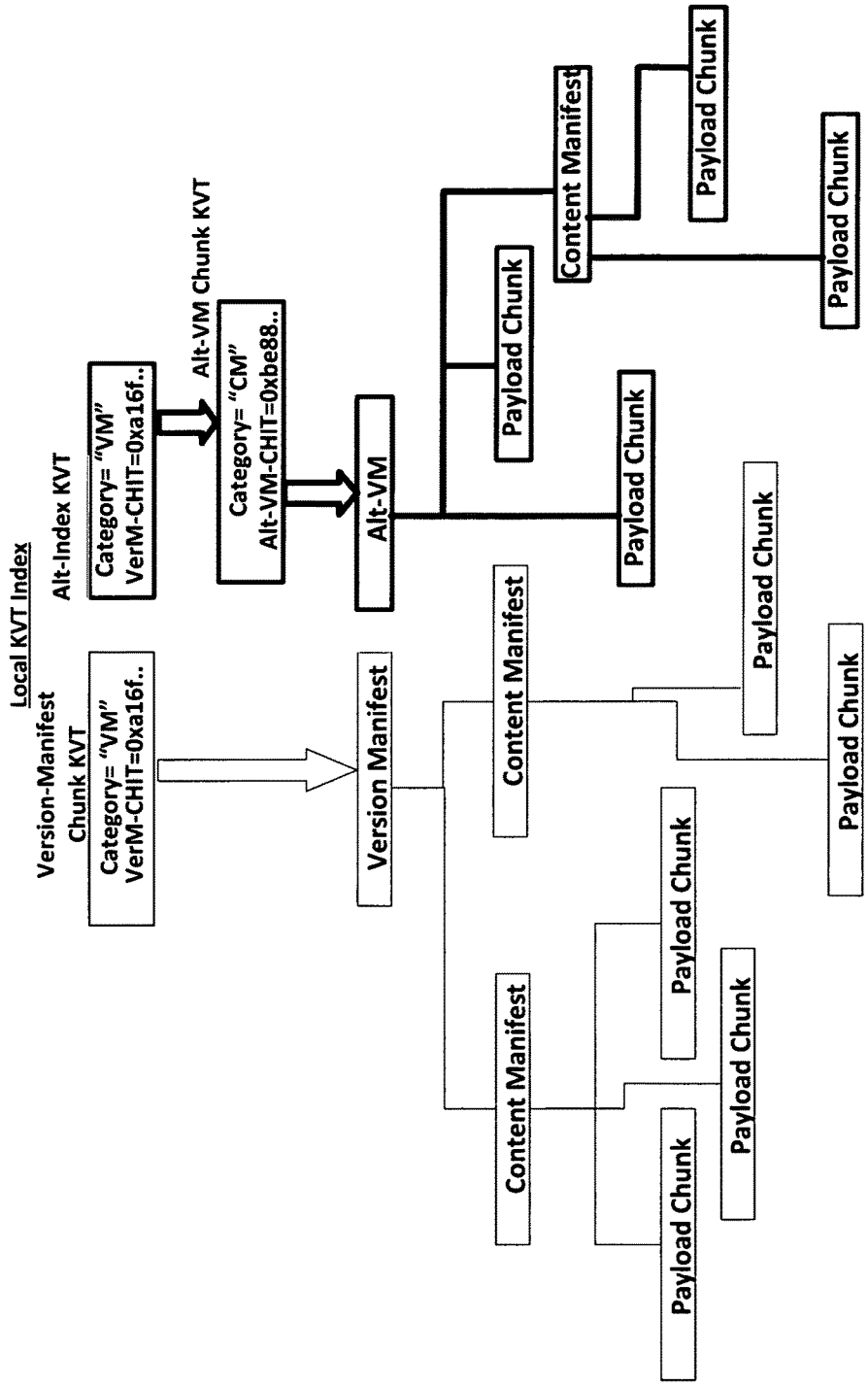
FIG. 8A depicts a Version-Manifest Chunk that has been restructured transparently into an Alternate Version-Manifest Chunk in accordance with an embodiment of the invention.
Figure 9A:
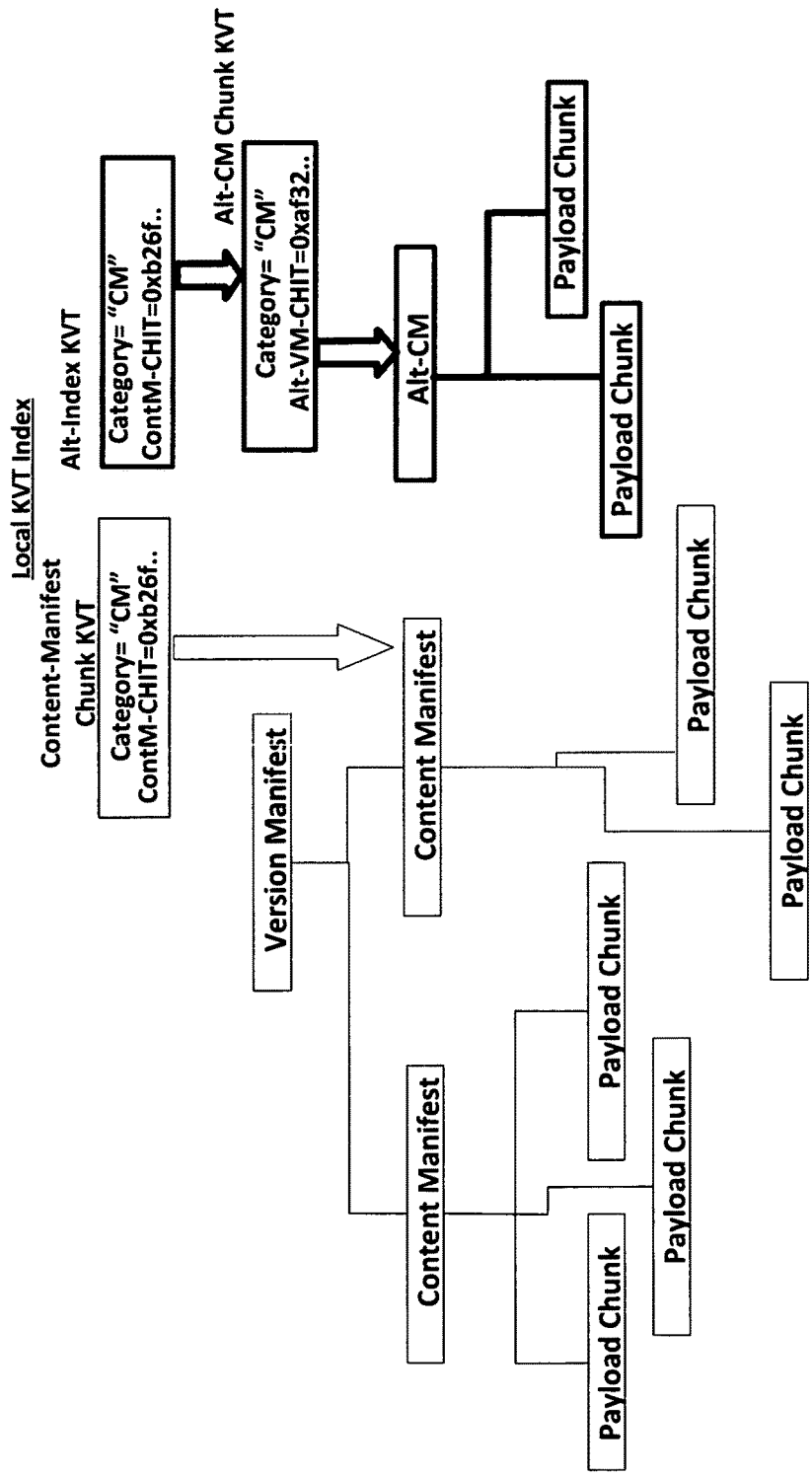
FIG. 9A depicts a Content-Manifest Chunk that has been restructured transparently into an Alternate Content-Manifest Chunk in accordance with an embodiment of the invention.

While FIGS. 5A, 6A and 7A each depict restructuring of a Payload Chunk, FIGS. 8A and 9A depict restructuring of a Manifest Chunks.

Figure 8B:
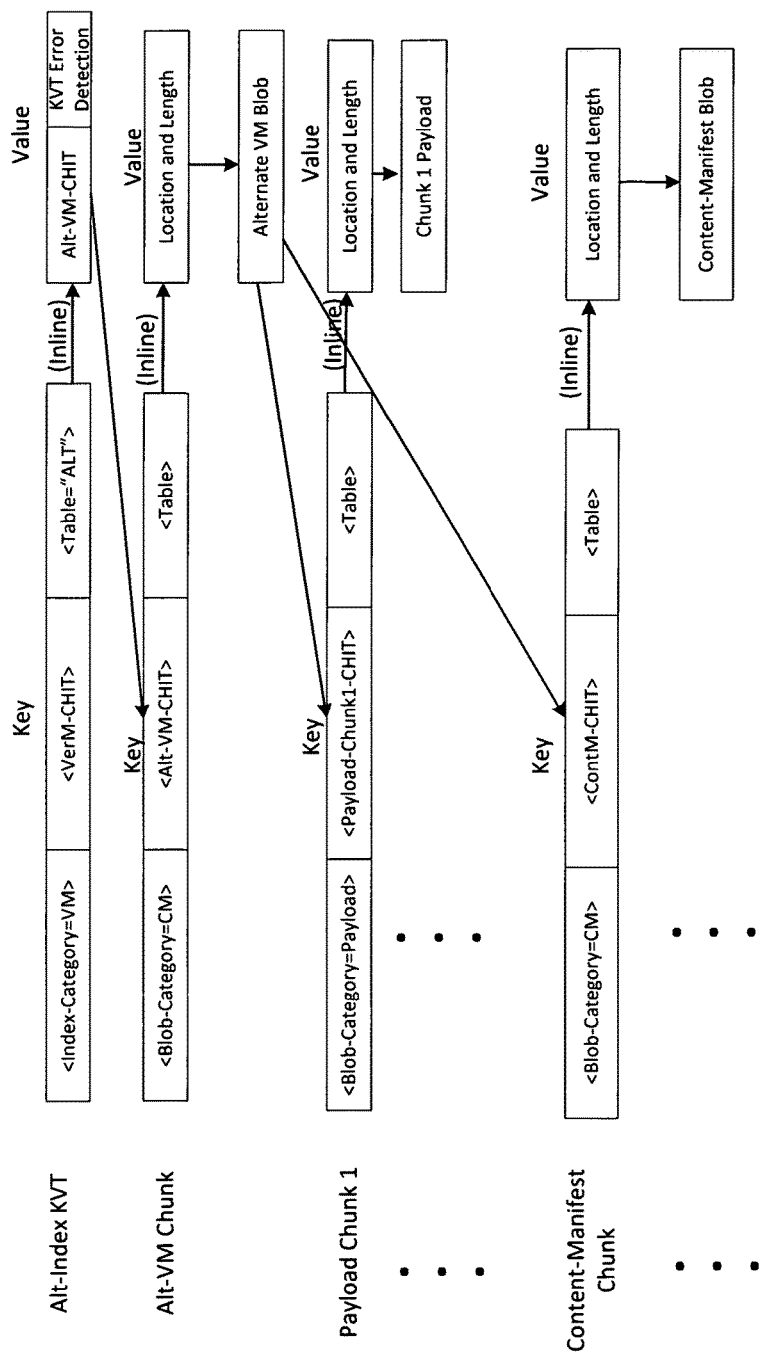
FIG. 8B depicts an Alt-Index KVT, an Alt-VM Chunk and Payload Chunks and/or Content Manifest Chunks which are used to implement the restructuring shown in FIG. 8A in accordance with an embodiment of the invention.
Figure 8C:
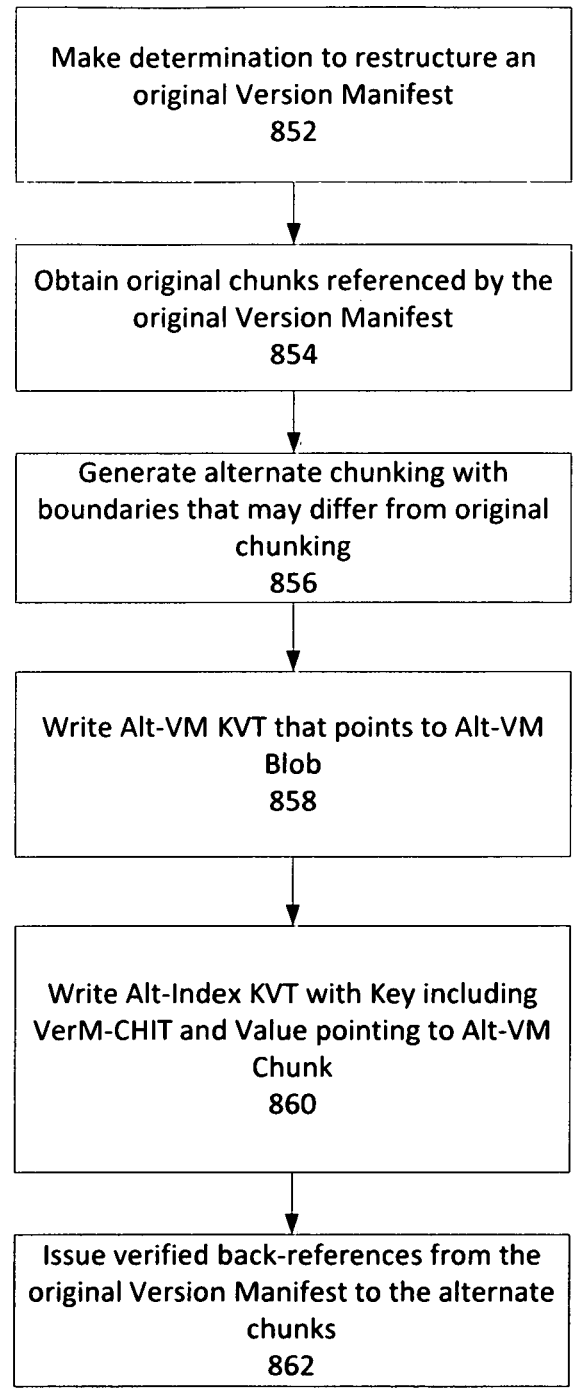
FIG. 8C is a flow chart of a method of restructuring the Version-Manifest Chunk in accordance with an embodiment of the invention.
Figure 8D:
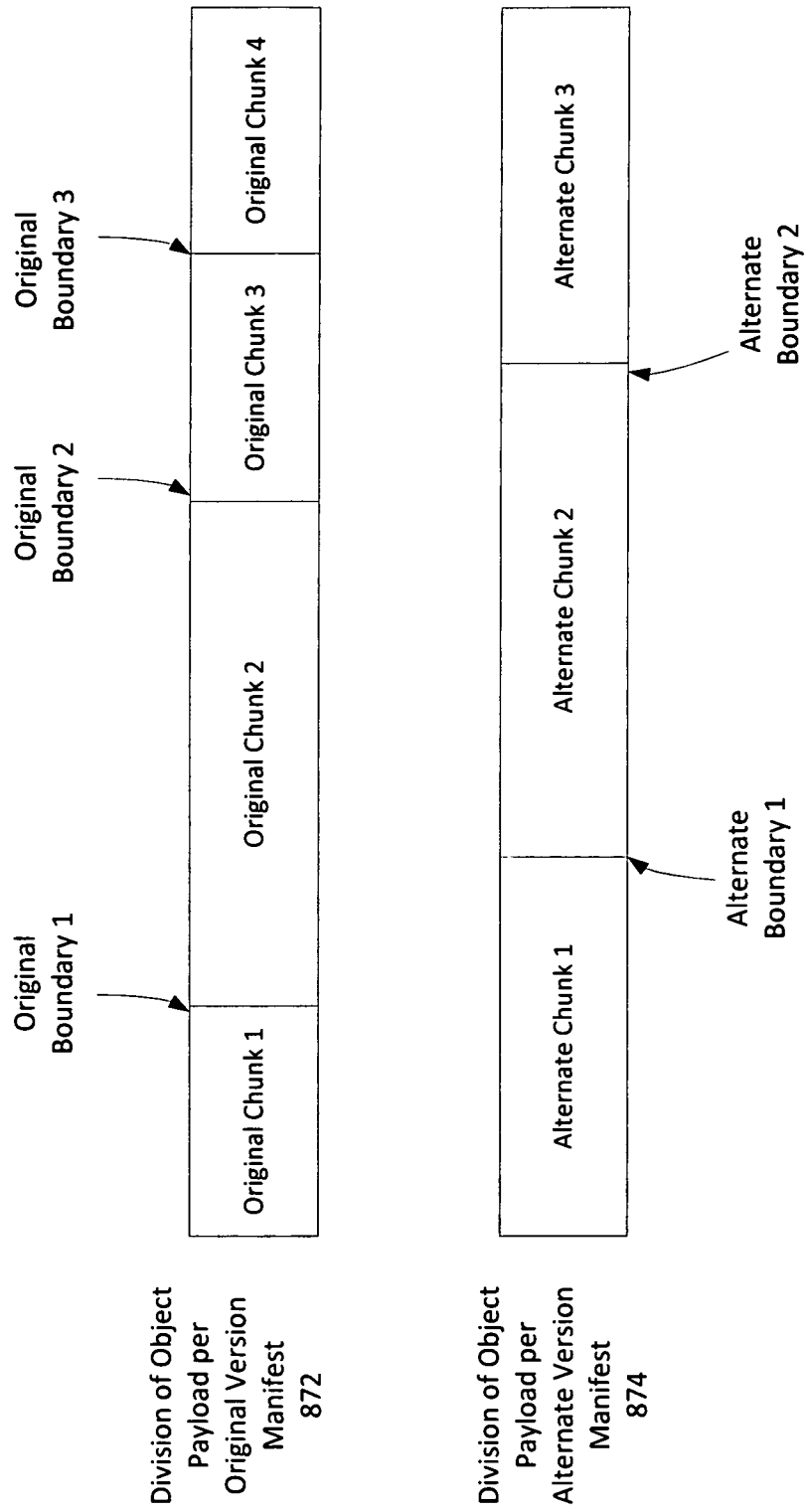
FIG. 8D depicts an example of a change in boundaries from an Original Version Manifest to an Alternate Version Manifest in accordance with an embodiment of the invention.

FIG. 8A depicts the restructuring of a Version-Manifest Chunk into an Alternate Version-Manifest (Alt-VM) Chunk in accordance with an embodiment of the invention. FIG. 8B depicts an Alt-Index KVT, an Alt-VM Chunk and Payload Chunks and/or Content Manifest Chunks which are used to implement the restructuring shown in FIG. 8A in accordance with an embodiment of the invention. FIG. 8C is a flow chart of a method of restructuring the Version-Manifest Chunk in accordance with an embodiment of the invention. Finally, FIG. 8D illustrates example original and alternate chunkings of the original and alternate Version Manifests, respectively.

The Version-Manifest Chunk that is restructured includes a Version-Manifest Chunk KVT (depicted separately in FIG. 8A, though it is part of the Version-Manifest Chunk) and a Version-Manifest Blob. The Key of the Version-Manifest Chunk KVT has a VerM-CHIT (=0xa16f . . . , for example) that identifies the (Original) Version-Manifest Blob. In addition, the Key of the Version-Manifest Chunk KVT may have a " " (i.e. blank) in the type field (i.e. in the Table portion of the Key) to designate that the Version-Manifest Blob is in its original format.

The Alt-VM Chunk 810 includes an Alt-VM Chunk KVT (depicted separately in FIG. 8A, though it is part of the Alt-VM Chunk) and an Alt-VM Blob. The Key of the Alt-VM Chunk KVT may have a Blob-Category that indicates that the Chunk contains a Content Manifest (CM). (Note that the Blob-Category indicates a Content Manifest, not a Version Manifest, for purposes of maintaining transparency of the restructuring.) In addition, the Key of the Alt-VM Chunk KVT has an Alt-VM-CHIT (=0xbe88 . . . , for example) that identifies and validates the Alt-VM Blob. The Value of the Alt-VM Chunk KVT points to the Alt-VM Blob.

The present disclosure provides an Alt-Index KVT 815 that effectively links the Alt-VM Chunk to the (Original) Version Manifest Chunk in an advantageous way. The Key of the Alt-Index KVT has an Index-Category of VM (Version Manifest). In addition, the Key of the Alt-Index KVT includes the VerM-CHIT that identifies the (Original) Version Manifest Blob. In other words, the Alt-Index KVT includes the same CHIT as the CHIT of the (Original) Version Manifest. The Value of the Alt-Index KVT includes the Alt-VM-CHIT that points to the Alt-VM Chunk. Together, these features advantageously enable the retrieval of the Alt-VM Chunk when the (Original) Version Manifest Chunk is requested.

FIG. 8C is a flow chart of a method 850 of restructuring a Version Manifest in accordance with an embodiment of the invention. In step 852, a determination is made to restructure a Version Manifest. The Version Manifest being restructured may be referred to below as the original (or target) Version Manifest. As discussed above, the contents of the original Version Manifest may be stored in an original Version-Manifest Chunk.

In step 854, the original chunks referenced by the original Version Manifest may be obtained. These original chunks may be combined in an indicated order to regenerate the original object payload. A small example set of original chunks (Original Chunk 1, Original Chunk 2, Original Chunk 3 and Original Chunk 4) is depicted in FIG. 8D. Note that these original chunks in FIG. 8D may be either payload chunks or Content Manifest chunks (which may themselves point to payload chunks and/or Content Manifest chunks).

Also depicted in FIG. 8D are the original boundaries between the original chunks (Original Boundary 1 between Original Chunks 1 and 2, Original Boundary 2 between Original Chunks 2 and 3, and Original Boundary 3 between Original Chunks 3 and 4). The original boundaries depend on the original chunking (original division) performed when the Object payload is first put to the distributed object storage system.

In step 856, an alternate chunks are generated. A small example set of alternate chunks (Alternate Chunk 1, Alternate Chunk 2, and Alternate Chunk 3) generated by an alternate chunking of the original object payload depicted in FIG. 8D. Note that these alternate chunks in FIG. 8D may be either payload chunks or Content Manifest chunks (which may themselves point to payload chunks and/or Content Manifests). The alternate chunking may have boundaries that differ from the boundaries of the original chunking.

Also depicted in FIG. 8D are the alternate boundaries between the alternate chunks (Alternate Boundary 1 between Alternate Chunks 1 and 2, and Alternate Boundary 2 between Alternate Chunks 2 and 3). The alternate boundaries depend on the alternate chunking (i.e. the alternate division) performed on the Object payload.

Per step 858, the Alt-VM KVT that points to the Alt-VM Blob may be written to the local KVT index at the storage server. In addition, per step 860, the Alt-Index KVT (with Key including the VerM-CHIT and Value pointing to the Alt-VM Chunk) may be written to the local KVT index at the storage server. These steps are discussed in further detail above in relation to FIG. 8B.

Finally, per step 860, verified back-references may be issued from the original Version Manifest to the alternate chunks. The back-references indicate that the alternate chunks belong to the Object associated with the original Version Manifest.

Figure 9B:
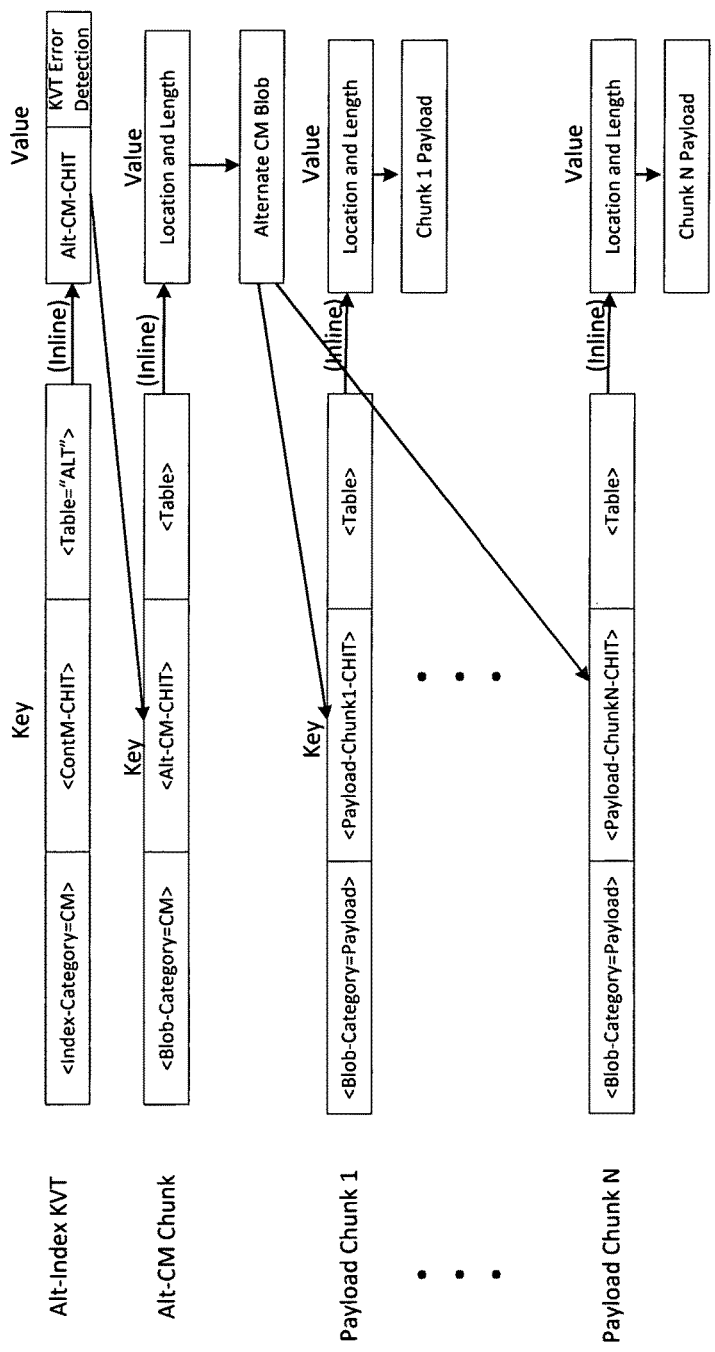
FIG. 9B depicts an Alt-Index KVT, an Alt-CM Chunk and Payload Chunks and/or Content Manifest Chunks which are used to implement the restructuring shown in FIG. 9A in accordance with an embodiment of the invention.
Figure 9C:
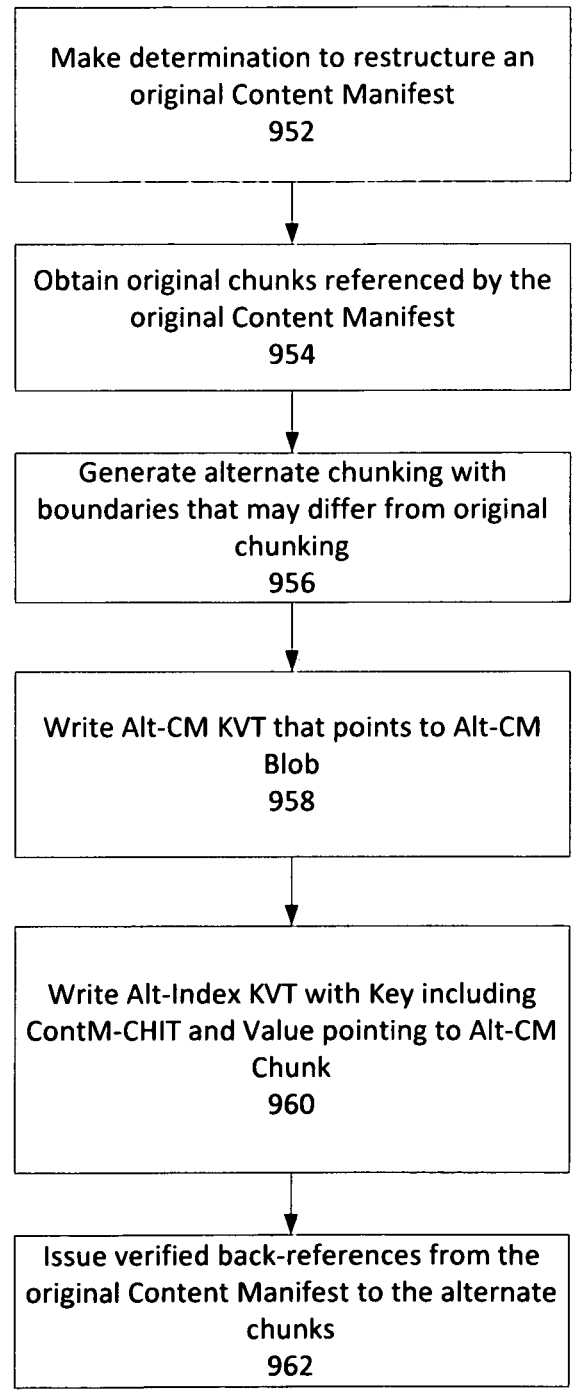
FIG. 9C is a flow chart of a method of restructuring the Content-Manifest Chunk in accordance with an embodiment of the invention.
Figure 9D:
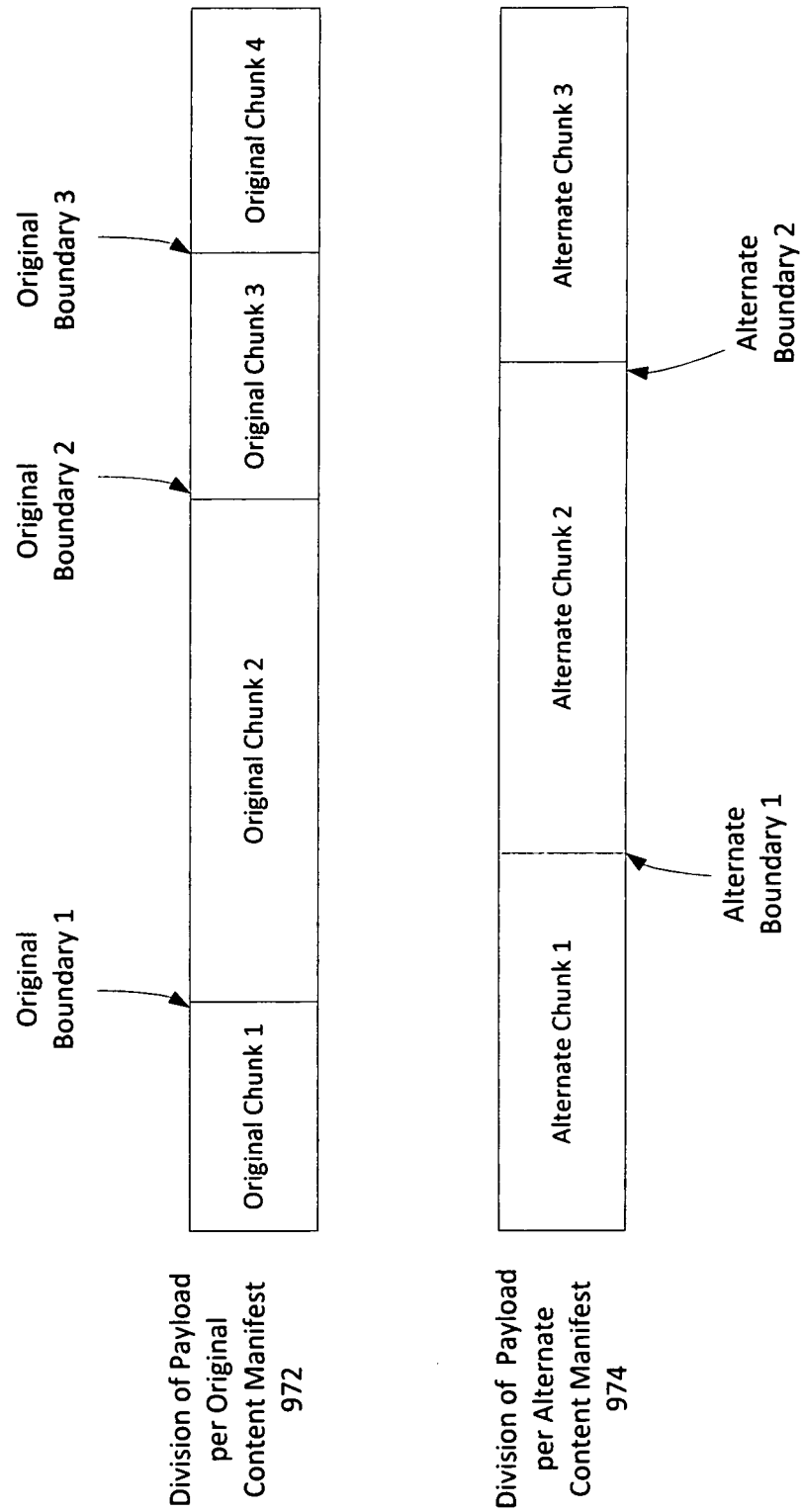
FIG. 9D depicts an example of a change in boundaries from an Original Content Manifest to an Alternate Content Manifest in accordance with an embodiment of the invention.

FIG. 9A depicts a Content-Manifest Chunk that has been restructured transparently into an Alternate Content-Manifest Chunk in accordance with an embodiment of the invention. FIG. 9B depicts an Alt-Index KVT, an Alt-CM Chunk and Payload Chunks which are used to implement the restructuring shown in FIG. 9A in accordance with an embodiment of the invention. FIG. 9C is a flow chart of a method of restructuring the Content-Manifest Chunk in accordance with an embodiment of the invention. Finally, FIG. 9D illustrates example original and alternate chunkings of the original and alternate Content Manifests, respectively.

The Content-Manifest Chunk that is restructured includes a Content-Manifest Chunk KVT (depicted separately in FIG. 9A, though it is part of the Content-Manifest Chunk) and a Content-Manifest Blob. The Key of the Content-Manifest Chunk KVT has a ContM-CHIT (=0xb26f..., for example) that identifies the (Original) Content-Manifest Blob. In addition, the Key of the Content-Manifest Chunk KVT may have a " " (i.e. blank) in the type field (i.e. in the Table portion of the Key) to designate that the Content-Manifest Blob is in its original format.

The Alt-CM Chunk 910 includes an Alt-CM Chunk KVT (depicted separately in FIG. 9A, though it is part of the Alt-CM Chunk) and an Alt-CM Blob. The Key of the Alt-CM Chunk KVT may have a Blob-Category that indicates that the Chunk contains a Content Manifest (CM). In addition, the Key of the Alt-CM Chunk KVT has an Alt-CM-CHIT (=0xaf32..., for example) that identifies and validates the Alt-CM Blob. The Value of the Alt-CM Chunk KVT points to the Alt-CM Blob.

The present disclosure provides an Alt-Index KVT 915 that effectively links the Alt-CM Chunk to the (Original) Content Manifest Chunk in an advantageous way. The Key of the Alt-Index KVT has an Index-Category of CM (Content Manifest). In addition, the Key of the Alt-Index KVT includes the ContM-CHIT that identifies the (Original) Content Manifest Blob. In other words, the Alt-Index KVT includes the same CHIT as the CHIT of the (Original) Content Manifest. The Value of the Alt-Index KVT includes the Alt-CM-CHIT that points to the Alt-CM Chunk. Together, these features advantageously enable the retrieval of the Alt-CM Chunk when the (Original) Content Manifest Chunk is requested.

FIG. 9C is a flow chart of a method 950 of restructuring a Content Manifest in accordance with an embodiment of the invention. In step 952, a determination is made to restructure a Content Manifest. The Content Manifest being restructured may be referred to below as the original (or target) Content Manifest. As discussed above, the contents of the original Content Manifest may be stored in an original Content-Manifest Chunk.

In step 954, the original chunks referenced by the original Content Manifest may be obtained. These original chunks may be combined in an indicated order to regenerate the original Content Manifest payload. A small example set of original chunks (Original Chunk 1, Original Chunk 2, Original Chunk 3 and Original Chunk 4) is depicted in FIG. 9D. Note that these original chunks in FIG. 9D may be either payload chunks or Content Manifest chunks (which may themselves point to payload chunks and/or Content Manifest chunks).

Also depicted in FIG. 9D are the original boundaries between the original chunks (Original Boundary 1 between Original Chunks 1 and 2, Original Boundary 2 between Original Chunks 2 and 3, and Original Boundary 3 between Original Chunks 3 and 4). The original boundaries depend on the original chunking (original division) performed when the Content Manifest payload is first put to the distributed object storage system.

In step 956, an alternate chunks are generated. A small example set of alternate chunks (Alternate Chunk 1, Alternate Chunk 2, and Alternate Chunk 3) generated by an alternate chunking of the original object payload depicted in FIG. 9D. Note that these alternate chunks in FIG. 9D may be either payload chunks or Content Manifest chunks (which may themselves point to payload chunks and/or Content Manifests). The alternate chunking may have boundaries that differ from the boundaries of the original chunking.

Also depicted in FIG. 9D are the alternate boundaries between the alternate chunks (Alternate Boundary 1 between Alternate Chunks 1 and 2, and Alternate Boundary 2 between Alternate Chunks 2 and 3). The alternate boundaries depend on the alternate chunking (i.e. the alternate division) performed on the Content Manifest payload.

Per step 958, the Alt-CM KVT that points to the Alt-CM Blob may be written to the local KVT index at the storage server. In addition, per step 960, the Alt-Index KVT (with Key including the ContM-CHIT and Value pointing to the Alt-CM Chunk) may be written to the local KVT index at the storage server. These steps are discussed in further detail above in relation to FIG. 9B.

Finally, per step 960, verified back-references may be issued from the original Content Manifest to the alternate chunks. The back-references indicate that the alternate chunks belong to the Object associated with the original Content Manifest.

Parallel Restructuring Method

Figure 10:
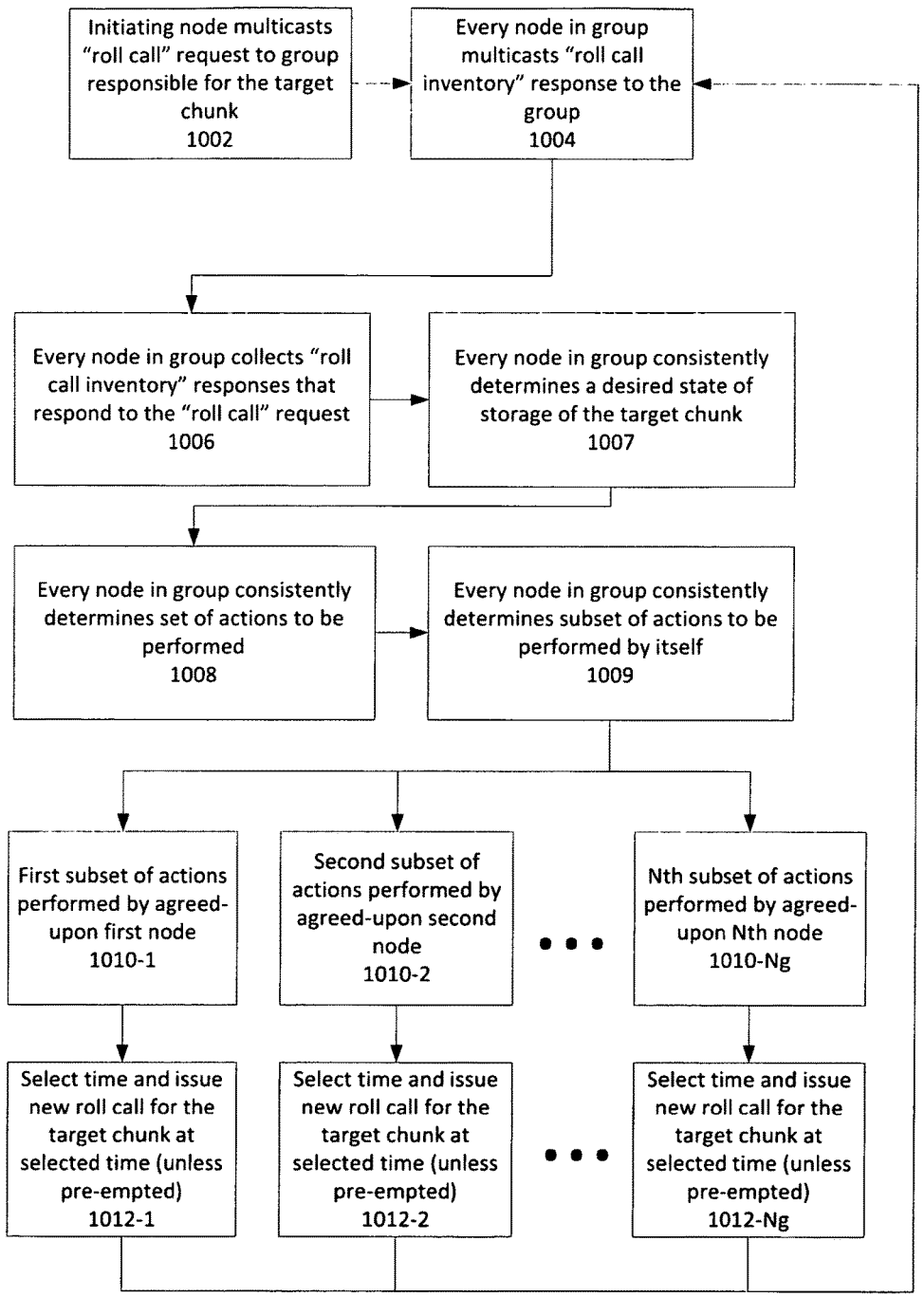
FIG. 10 is a flow chart of a method of parallel restructuring a chunk in a distributed object storage system in accordance with an embodiment of the invention.

FIG. 10 is a flow chart of a method 1000 of parallel restructuring of a chunk in a distributed object storage system using iterative collaboration in accordance with an embodiment of the invention. Multicast messaging is used to collect the current state of how a specific chunk is stored in the object cluster. Multicast messaging is then used to iterate towards a desired state through a series of steps. Note that the method 1000 advantageously does not require (or use) any single node to drive the restructuring process.

i) Initiating Roll Call

Per step 1002, an initiating node multicasts a "roll call" request to the group responsible for the chunk to be restructured (i.e. for the target chunk). In the above-described distributed object storage system, the initiating node may be a storage server of the distributed object storage system. In an exemplary implementation, the group responsible for the target chunk may be a negotiating group for the target chunk, where the negotiating group is identified using a cryptographic hash identifier of the chunk. The negotiating group for a target chunk is a group of the storage servers (nodes) in the storage system that are assigned to store and provide access to the target chunk. However, alternate methods of identifying an existing multicast group for the target chunk may be used instead.

In other words, in accordance with an embodiment of the invention, when a target chunk has been identified as a candidate for restructuring, a multicast "roll call" message may be sent to the Negotiating Group for that target chunk. This message preferably includes an identifier of the Negotiating Group, an identifier for the target chunk, the specific restructuring algorithm to be used, and a unique identifier of the roll call. One embodiment of the roll call identifier is formed by concatenating a timestamp and the IP address of the requester. Alternately, the roll-call identifier may be a concatenation of a sequence number and the source IP address.

ii) Roll Call Inventory Response

Per step 1004, each node in the group receiving the request multicasts a "roll call inventory" response to the "roll call" request to all the other nodes in the group. The roll call inventory response message identifies: a) the roll call message being responded to; b) the specific storage node that is responding; and c) which, if any, format(s) this storage node has (or has begun building) for this specified chunk. In other words, each roll call inventory response from a node enumerates the encodings of the target chunk (including original and/or alternate formats) that are stored at that node.

In other words, in accordance with an embodiment of the invention, each recipient of the restructuring roll call request responds with a restructuring chunk inventory multicast message which it sends to the same Negotiating Group. This roll call inventory response may preferably include:

the echoed identifier of the roll call request;

the identity of the responding object storage server instance;

the identifier of the target chunk being queried; and how the identified target chunk is encoded on local storage by this instance.

In an exemplary implementation, "how the target chunk is encoded on local storage" may be: not at all; as a whole copy of the target chunk in the original format; as a compressed version of the target chunk; as an erasure-encoding Content Manifest for the target chunk; an erasure-encoded slice derived from the target chunk; as a delta Content Manifest for the target chunk; as a delta chunk derived from the target chunk (and a base chunk); as a base chunk related to a delta chunk; or as a combination of the foregoing. In other implementations, other alternate encodings may be used.

iii) Collection of Roll Call Inventory Responses

Per step 1006, every node in the group collects "roll call inventory" responses that respond to the "roll call" request. By having every node in the group collect the roll call inventories, every node has the information needed to evaluate the collective inventories within the group to formulate a same set of actions. While every member of the group collects the full set of inventory responses that it receives for any given roll call request, a dropped message may be simply ignored without a retransmission request.

Note that a storage server may receive roll call Inventory responses to a roll call request that it did not hear. Embodiments are free to either ignore such messages, or to retroactively infer reception of the roll call request by not only collecting the response but responding to it as well.

iv) Evaluation of Roll Call Inventory Responses and Determination of Desired Storage State and Subset of Actions to be Performed by Individual Node Per steps 1007 and 1008, every node in the group evaluates, in parallel, the collected roll call inventory messages to determine the desired state of storage for the chunk amongst the nodes in the group (step 1007) and the set of actions that are required to be performed by the nodes of the group in order to achieve the desired state (step 1008). The logical evaluation by a node may begin once roll call inventory response messages have been received from all members of the group, or after a predetermined time has elapsed that is sufficient such that no more responses can be reasonably expected.

In an exemplary implementation, the desired state of storage may be one of various states. A first state may store original-format whole-replica chunks at different nodes in the group. A second state may store compressed chunks at different nodes in the group. A third state may store erasure-encoded slices at different nodes in the group. A fourth state may store delta and base chunks at different nodes in the group. Other states may store the chunk in various different formats (encodings) in the group.

The desired state of storage for a target chunk may change over time. For example, the desired state may begin in the first state where original-format whole replicas are stored at different nodes. Subsequently, if storage space becomes scarce, then the desired state may change to the second state where compressed chunks are stored at different nodes. If storage space becomes more scarce, then the desired state may change to the third state where a sufficient number of erasure-encoded slices are stored at different nodes. As another example, if a target chunk is a small update to an existing chunk, then the desired state may change from the first state where whole replicas are stored to the fourth state where a delta chunk is stored to indicate changes relative to the existing chunk.

In an exemplary implementation, the set of actions determined may include: unicasting or multicasting the whole chunk in its original format to create new replicas at other nodes in the group; creating and potentially transferring a compressed copy of the whole chunk; creating and potentially transferring an erasure-encoding Content Manifest and/or erasure-encoded slices of the chunk; creating and potentially transferring a delta Content Manifest and/or a delta payload chunk relative to a base chunk. The evaluation depends upon the collective roll call inventories from the nodes in the group. The evaluation depends on which nodes in the group already stores encodings of the target chunk and what those encodings are.

In other words, each member of the group evaluates the collected responses, determines the collective action required (if any) and assigns itself a portion (if any) of that work. This assignment is based upon parallel evaluation that orders both the tasks to be done and the available storage nodes. Any ordering algorithm is acceptable as long as all members of the nodes will assign the same work to the same storage nodes without the need for active collaboration.

Per step 1009, every node in the group determines a subset of the set of actions to be performed by itself. The subset of actions assigned to a node is determined in a same agreed-upon manner at each node in the group. The subset of actions for a particular node may depend upon the particular node's place in the ordering of the nodes in the group. The ordering may be, for example, a sorted order based on a node identifier.

v) Performance of Subsets of Actions by Nodes in the Group

Per steps 1010-n, for n=1 to Ng, where Ng is the number of nodes in the group, the nth node in the group performs an nth subset of actions. The subset of actions to be performed by a node being determined in step 1009 as discussed above. As mentioned above, the subset of actions may include: unicasting or multicasting the whole chunk in its original format to create new replicas at other nodes in the group; creating and potentially transferring a compressed copy of the whole chunk; creating and potentially transferring an erasure-encoding Content Manifest and/or erasure-encoded slices of the chunk; creating and potentially transferring a delta Content Manifest and/or a delta payload chunk relative to a base chunk. Note that it is possible that a subset of actions may be empty, in which case the node corresponding to that subset is not assigned to perform any action.

vi) Selection of Pseudo-Random Times for New Roll Call Request

Per steps 1012-n, for n=1 to Ng, when a node completes its assigned subset of actions, a time may be selected for a new roll call request. The time may be selected pseudo-randomly to distributed the selected times amongst the nodes in the group. At the selected time, the new roll call request may be multicast from the node to the group. However, if a restructuring roll call for the same chunk is received before the selected time, then the multicasting of the new roll call request at the selected time will be pre-empted for the node.

In other words, after completing its work pursuant to a prior roll call, a storage node will pseudo-randomly select a time to issue a new roll call for the chunk. The new roll call for the chunk will be pre-empted should a roll call for the same chunk be received before the node's own new roll call is issued.

The above-described pseudo-random mechanism that distributes the issuance of new roll call requests advantageously prevents multiple nodes from flooding the available network at the same time.

vii) Next Iteration Initiated by New Roll Call Request

Upon a new roll call request being sent by any one of the nodes, then the method 1000 loops back to step 1014 and a next iteration is performed. In this way, the method collaboratively iterates in a dynamic manner to a desirable state. In accordance with an embodiment of the invention, the procedures of the presently-disclosed solution converge upon a stable encoding of the chunk, either as whole replicas in the original format, or as chunks in an alternate format, or the combination of the foregoing. Lost chunks or slices may be replaced through background scanning of the multicast group.

Note that the method 1000 depicted in FIG. 10 uses a pseudo-random mechanism to select in an ad-hoc manner the executor of the next roll call. An alternate embodiment may utilize a deterministic way of, effectively, determining the master of the next iteration. For example, one deterministic technique would be to issue the next roll call from the first node ID in a sorted list of node IDs of the nodes that take part in the iteration. Other pseudo-random or deterministic techniques may be used in other implementations.

FIG. 11 is a flow chart showing that the restructuring of a chunk using the presently-disclosed technique may be performed by a live system because the restructuring does not interfere with normal operations of the system relating to the chunk. In particular, the flow chart shows a method 1100 performed by the live system. In this method 1100, restructuring of a chunk does not interfere with processing a get request for the chunk, and processing the get request for the chunk does not interfere with the restructuring of the chunk.

Per step 1112, the original chunk is stored in the distributed object storage system. Subsequently, both restructuring (steps 1122 and 1124) and retrieval (steps 1132 and 1134) of the chunk may be performed by the live system in parallel. Note that the chunk being restructured may be a payload chunk or a manifest chunk.

Per step 1122, the restructuring of the original chunk is initiated within the live system. For example, a roll call request for the restructuring may be issued, as described above in relation to FIG. 10, for example.

Per step 1124, the live system performs the restructuring process (for example, as described above in relation to FIG. 10). Because the restructuring process leaves the original chunk unchanged while adding the alternate chunk, a get request for the original chunk may be processed in parallel without interfering with the restructuring process.

Per step 1132, a get request to retrieve the original chunk may be received by a gateway to the live system. Per step 1134, because the retrieval process may be performed without the alternate chunk, the live system may process the get request and send the original chunk in a response to the gateway. Meanwhile, the restructuring of the original chunk may proceed in parallel without interfering with the processing of the get request.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of restructuring content stored at a storage server of a distributed object storage system, the method comprising:
   determining that an original chunk containing original content is to be restructured into an alternate chunk containing alternate content deriving the alternate content from the original content;
   writing the alternate chunk; and
   writing an alternate-index key-value tuple (KVT) that establishes the alternate chunk as containing an alternate encoding of the original chunk.

2. The method of claim 1, wherein the alternate-index KVT comprises:
   a searchable key that includes an original chunk identifying token (CHIT) which identifies the original content; and
   a value that includes an alternate CHIT which identifies the alternate content.

3. The method of claim 1, wherein the original content is of a category from a group of categories consisting of a payload category, a Content Manifest category, and a Version Manifest category.

4. The method of claim 1, wherein the alternate content is of a category from a group of categories consisting of a payload category, a Content Manifest category, and a Version Manifest category.

5. The method of claim 1, wherein the alternate content, when represented by an alternate manifest, comprises payload chunks using different chunk boundaries; the method comprising:
   generating alternate chunks with new boundaries;
   creating an alternate manifest KVT to an original manifest that represents the original content; and
   issuing verified back references from the original manifest to the alternate chunks referenced using the alternate manifest.

6. The method of claim 1, wherein the alternate content comprises a compressed version of the original content.

7. The method of claim 1, wherein the alternate content comprises a slice of a set of erasure-encoded slices generated from the original content.

8. The method of claim 1, wherein the alternate content comprises changes relative to a content of a referenced chunk.

9. The method of claim 1, further comprising:
   reducing a retention requirement for the original content after successfully writing the alternate chunk and the alternate-index KVT.

10. The method of claim 9, wherein the retention requirement for a given replica of a chunk on a specific storage server is reduced by marking an original KVT for the original chunk as releasable.

* * * * *